US010200877B1

(12) United States Patent
Skidmore et al.

(10) Patent No.: US 10,200,877 B1
(45) Date of Patent: Feb. 5, 2019

(54) SYSTEMS AND METHODS FOR TELECOMMUNICATIONS NETWORK DESIGN, IMPROVEMENT, EXPANSION, AND DEPLOYMENT

(71) Applicants: Roger Ray Skidmore, Austin, TX (US); Keith John Astoria, Cedar Park, TX (US); Keith Dawson Bray, Austin, TX (US)

(72) Inventors: Roger Ray Skidmore, Austin, TX (US); Keith John Astoria, Cedar Park, TX (US); Keith Dawson Bray, Austin, TX (US)

( * ) Notice: Subject to any disclaimer, the term of this patent is extended or adjusted under 35 U.S.C. 154(b) by 27 days.

(21) Appl. No.: 15/154,654

(22) Filed: May 13, 2016

Related U.S. Application Data

(60) Provisional application No. 62/161,754, filed on May 14, 2015.

(51) Int. Cl.
*H04W 16/22* (2009.01)
*H04W 16/18* (2009.01)

(52) U.S. Cl.
CPC ........... *H04W 16/22* (2013.01); *H04W 16/18* (2013.01)

(58) Field of Classification Search
CPC .............................. H04W 16/22; H04W 16/18
See application file for complete search history.

(56) References Cited

U.S. PATENT DOCUMENTS

| | | | |
|---|---|---|---|
| 6,754,487 B1* | 6/2004 | Sanders | H04W 24/00 455/226.1 |
| 6,850,764 B1* | 2/2005 | Patel | H04W 72/0453 455/450 |
| 6,996,374 B1* | 2/2006 | Bao | H04W 24/02 455/423 |
| 8,538,787 B2* | 9/2013 | Braun | G06Q 10/06 705/7.11 |
| 9,439,081 B1* | 9/2016 | Knebl | H04W 16/18 |
| 2002/0198694 A1* | 12/2002 | Yang | G06F 17/5009 703/6 |
| 2006/0019679 A1* | 1/2006 | Rappaport | G01S 5/0252 455/456.5 |
| 2007/0192065 A1* | 8/2007 | Riggs | G06Q 10/04 702/189 |
| 2008/0096566 A1* | 4/2008 | Brunner | C07D 491/04 455/437 |
| 2008/0109731 A1* | 5/2008 | Chang | H04L 41/147 715/736 |
| 2011/0149782 A1* | 6/2011 | Townley | H04L 41/147 370/252 |

(Continued)

*Primary Examiner* — Babar Sarwar
(74) *Attorney, Agent, or Firm* — W&C IP

(57) ABSTRACT

A cloud-based platform is provided offering large-scale and dynamic data analysis, processing, and exchange for telecommunications network design and deployment. It is configured to accommodate local, regional, and nationwide network planning and management needs. Information relevant to the network and individual design projects is organized with respect to a shared timeline that is shared with all project teams. All on-going and committed planned projects related to network performance are tracked on the shared timeline, with predicted network performance continually and automatically updated at regular intervals.

23 Claims, 20 Drawing Sheets

(56) References Cited

U.S. PATENT DOCUMENTS

| | | | |
|---|---|---|---|
| 2012/0303413 A1* | 11/2012 | Wang | G06Q 10/0631 |
| | | | 705/7.31 |
| 2012/0315949 A1* | 12/2012 | Zhang | H04W 24/08 |
| | | | 455/525 |
| 2013/0143561 A1* | 6/2013 | Nuss | H04W 24/02 |
| | | | 455/436 |
| 2013/0281089 A1* | 10/2013 | Chandrasekhar | H04W 24/02 |
| | | | 455/434 |
| 2013/0281100 A1* | 10/2013 | Lanzo | H04W 16/18 |
| | | | 455/446 |
| 2013/0282189 A1* | 10/2013 | Stoupis | H02J 3/00 |
| | | | 700/286 |
| 2013/0331109 A1* | 12/2013 | Dhillon | H04W 24/02 |
| | | | 455/446 |
| 2014/0111517 A1* | 4/2014 | Vela | H04W 4/24 |
| | | | 345/440 |
| 2014/0113600 A1* | 4/2014 | El Gamal | H04W 28/16 |
| | | | 455/414.3 |
| 2015/0012148 A1* | 1/2015 | Bhageria, Jr. | G06Q 10/06 |
| | | | 700/295 |
| 2015/0094087 A1* | 4/2015 | Chen | G01S 5/0252 |
| | | | 455/456.1 |
| 2016/0295521 A1* | 10/2016 | Grayson | H04W 4/02 |
| 2016/0330643 A1* | 11/2016 | Sahin | H04W 16/14 |
| 2017/0019795 A1* | 1/2017 | Takahashi | H04W 16/18 |
| 2017/0094443 A1* | 3/2017 | Kim | H04W 74/085 |

* cited by examiner

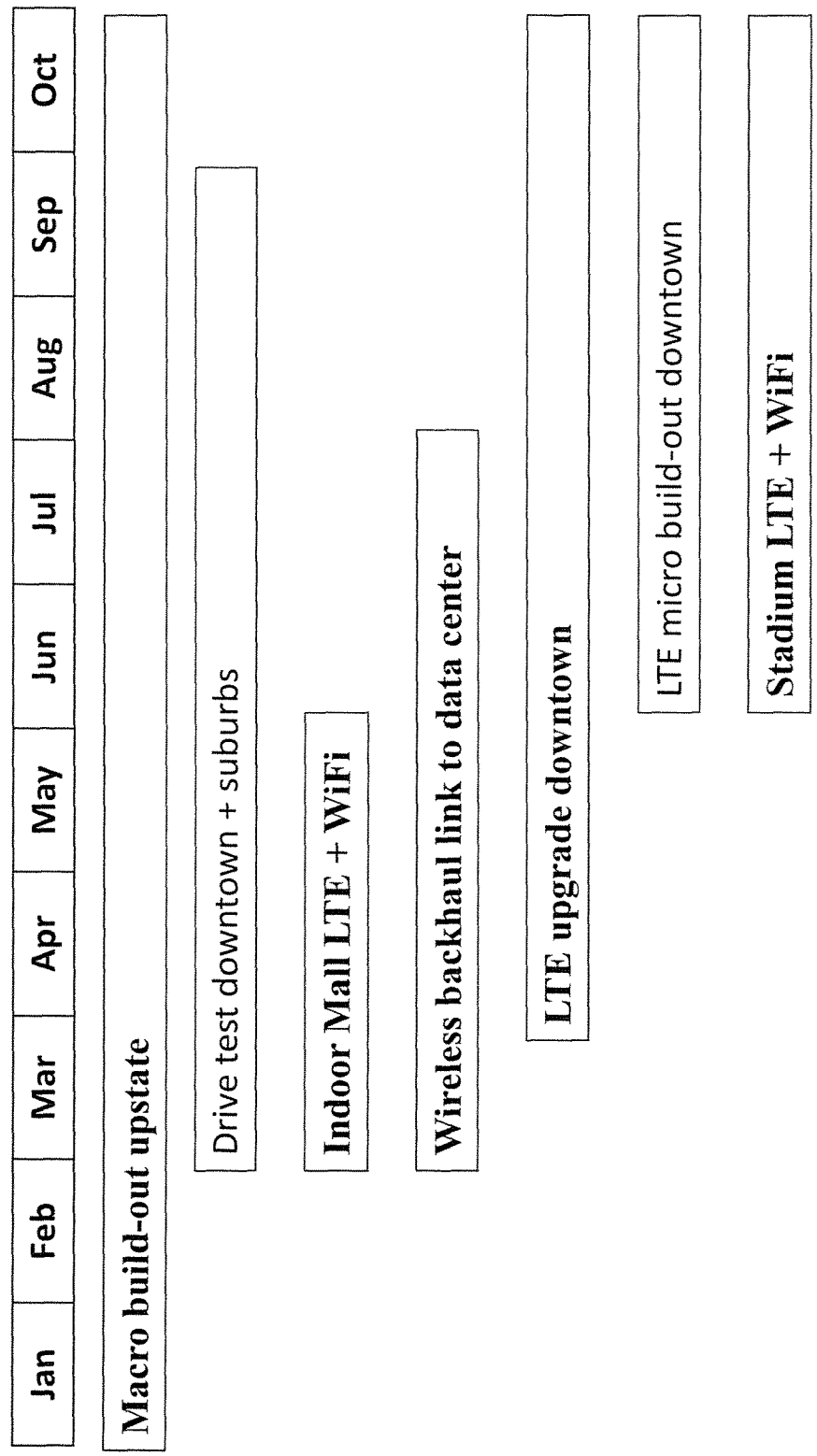

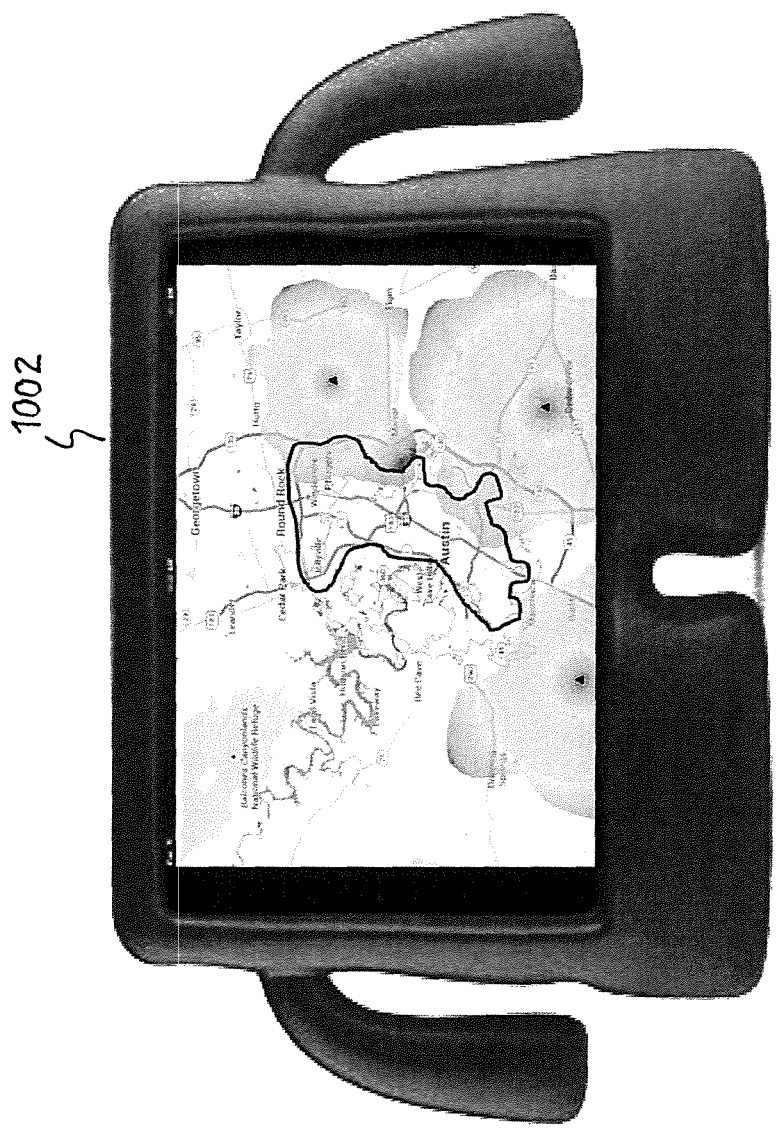
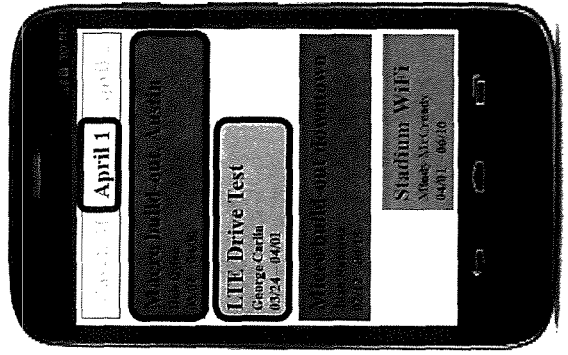
Figure 10

SYSTEMS AND METHODS FOR TELECOMMUNICATIONS NETWORK DESIGN, IMPROVEMENT, EXPANSION, AND DEPLOYMENT

CROSS-REFERENCE TO RELATED APPLICATIONS

This application claims the benefit of U.S. Provisional Patent Application No. 62/161,754, filed May 14, 2015, the complete contents of which are herein incorporated by reference.

FIELD OF THE INVENTION

The invention generally relates to telecommunications networks and, more particularly, tools for telecommunications network design and deployment.

BACKGROUND

Core network design and deployment workflow of carriers and wireless internet service providers (ISPs) has not significantly changed since the 1990s. Static geographic information system (GIS) data is utilized for basic network planning. Single-seat licensed software applications are used for predicted network planning. These typically operate on independent workstations (e.g., desktop computers) and generally have no communication or coordination with applications or licensed seats operating on other workstations, even those belonging to the same carrier or ISP but managed by other persons and/or engineering design teams. Simulations and plots are run on the individual workstations and saved as local files that are usually accessed only by the design team that created them.

The traditional software applications for network modeling and simulation use a fixed, bounded view of the network. Limited scalability of predictive tools means only certain scale geographical areas are considered at one time.

Furthermore, measurement data is put to limited use. There exists no intelligent assessment of how to re-use measurement data beyond the original purpose for which it was collected. There is also no intelligent assessment of overall measurement data validity after its collection. Generally, a fairly arbitrary validity period (e.g., 6 months) is selected such that at the end of the time period the data is discarded as being purportedly invalid. Such data may have been invalid after 2 months or may still be valid after 2 years, for example.

Further hindering measurement data re-use is the conventional belief within the industry that any changes to network assets or infrastructure renders existing collected measurements invalid. In reality, the type of changes made to existing network assets and infrastructure need to be considered before concluding that existing measurement data is no longer valid. There currently exists no intelligent method for assessing ongoing measurement data validity in the face of changing network assets or infrastructure.

Wireless network design typically involves the following basic steps for discrete teams focused on a given geographical area:
1. Determine network design goals
2. Acquire GIS data, convert to proper format, import to design tool(s)
3. Utilize design tool(s), iterating to accomplish network design goals
4. Convert design into deployment plan of record; may require many months to implement design This traditional form of wireless network design is largely a manual process. Coordination between multiple teams operating concurrently within the same geographic region, where coordination even exists, must be separately handled by project owners (i.e., the human leaders of projects). Shifting design goals or newly updated GIS data may go unaccounted for or must be noticed and manually entered into existing design tools by a particular human team member. In other words, there is a requirement for design tool operators to manually update performance plots whenever any inputs change. The performance plots must then be assessed anew for validity given the new inputs. Time elapsed from when a design is confirmed/committed until deployment within the network is complete may be significant. Over such significant time windows, there is an increasing likelihood design goals, GIS data, or the overlapping work of concurrent teams may impact the deployment plan, frequently in a negative manner. Project teams operating in parallel within the same network region lack efficient tools to aid collaboration and limit potential conflicts.

SUMMARY

According to an aspect of the invention, a cloud-based platform is provided. The platform provides large-scale and dynamic data analysis, processing, and exchange for telecommunications network design and deployment. It is configured to accommodate local, regional, and nationwide network planning and management needs.

According to another aspect of the invention, information relevant to the network and individual projects is organized with respect to a shared timeline that can be shared with one or more or all project teams (e.g., project owners) and includes information concerning at least a plurality of different projects on the same timeline. New asset placements, changing asset configurations, planned measurement collections, etc. are all related by time. All on-going (i.e., underway) and planned projects related to network performance are tracked on the shared timeline, with predicted network performance continually and automatically updated at regular intervals (e.g., at the various stages of project completion for the multitude of projects). The shared timeline extends forward in time (e.g., to the furthest planned or committed asset placement) and maintains an archive of information associated with dates which have already passed.

Cloud scalability is used to maintain one seamless view of the complete network as it exists today and into the future (e.g., at a plurality of future dates). New planned network changes are tracked on the shared timeline, providing identification of when and where those changes are to occur. Non-asset related changes that impact the network (e.g., updated GIS data) may also be reflected on the shared timeline.

According to a further aspect of the invention, the platform includes open interfaces for streamlined integration with 3rd party solutions, such as modules which may be utilized by the platform.

In one aspect of the invention, a computer implemented method is provided for telecommunications network design and improvement management which comprises steps of: populating a central timeline with a plurality of separate projects for network expansion and improvement, wherein the plurality of separate projects each has its own project timeline including at least a start date or range and one or more project dates subsequent to the start date or range, the central timeline being maintained on a network of one or more computers, wherein one or more responsible parties to the projects are provided access to the central timeline through one or more electronic terminals configured to communicate with the one or more computers; modeling with the one or more computers network performance expected on at least one calendar date on the central timeline based on network changes provided by at least one future project completion or a network-impacting event; and modifying at least one project state of one or more of the plurality of separate projects that populate the central timeline based on the network performance modeling of the modeling step.

According to another aspect, the method of the preceding paragraph includes the further step of repeatedly obtaining updated network relevant data including one or more of updated geographic information system (GIS) data, updated measurement data, updated project data, updated asset data, and updated forecast data, wherein the step of modeling network performance is further based on network changes associated with one or more of the updated network relevant data.

According to another aspect, the method of the preceding paragraph is such that the step of repeatedly obtaining updated network relevant data includes obtaining measurement data collected in connection with a first project of the plurality of separate projects and wherein the at least one project state modified in the step of modifying includes a project state of a second project that is temporally parallel or subsequent to the first project, wherein the second project relies upon or utilizes to the measurement data collected in connection with the first project.

According to still another aspect, the computer implemented method includes a further step of generating one or more of a notification, an update, or action proposal for one or more projects of the plurality of separate projects which have future deadlines on the central timeline, the generating step being an automated response based on the network performance modeling of the modeling step.

According to still another aspect, the network changes involve changes in quality of service (QoS).

According to still another aspect, the computer implemented method includes the further step of obtaining one or more updated predictive models for use in the modeling step.

According to still another aspect, the computer implemented method further includes a step of automatically generating one or more projects in response to one or more events without a user command to create a new project, at least one project of the one or more projects being included on the central timeline in the populating step.

According to yet another aspect, the computer implemented method is such that the network-impacting event is a network outage event or some other network-impacting event.

According to yet another aspect, the computer implemented method is such that the modifying step modifies a project state of at least one completed project.

According to yet another aspect, the computer implemented method is such that the modeling step models network performance expected on at least one future calendar date on the central timeline.

According to yet another aspect, the computer implemented method is such that the network-impacting event takes place on the at least one future calendar date. Alternatively, the calendar date is the present date or a past date.

According to a further aspect of the invention, a computer implemented method is disclosed for telecommunications network design, comprising the steps of: receiving in a computer storage medium from at least a plurality of different projects, each of which encompass a same geographic location, one or more network relevant data for each of the plurality of different projects, wherein each datum of the one or more network relevant data has associated therewith at least an origin date, wherein the one or more network relevant data are selected from geographic information system (GIS) data, measurement data, project data, asset data, prediction data, and forecast data, wherein at least some of the plurality of different projects are performed at different times such that each datum of the one or more network relevant data of the at least some of the plurality of different projects have different origin dates; identifying, using one or more computers, each instance where a datum of the one or more network relevant data is different for different projects, and validating data for re-use in subsequent projects as being only data which has not changed since its origin date; and modeling network performance for a subsequent project different from the plurality of different projects, the new project encompasses the same geographic location, the modeling step utilizing at least one datum from the one or more network relevant data of the plurality of different projects stored in the computer storage medium that has been validated for re-use in subsequent projects.

According to yet a further aspect, the computer implemented method is such that the one or more network relevant data includes GIS data.

According to yet a further aspect, the computer implemented method is such that the one or more network relevant data includes measurement data.

According to yet a further aspect, the computer implemented method is such that the one or more network relevant data includes forecast data.

According to still another aspect of the invention, a computer implemented method is disclosed for telecommunications network design, comprising the steps of: receiving in a computer storage medium from at least a plurality of different projects, each of which encompass a same geographic location, one or more network relevant data for each of the plurality of different projects, wherein each datum of the one or more network relevant data has associated therewith at least an origin date, wherein the one or more network relevant data are selected from geographic information system (GIS) data, measurement data, project data, asset data, prediction data, and forecast data, wherein at least some of the plurality of different projects are performed at different times such that each datum of the one or more network relevant data of the at least some of the plurality of different projects have different origin dates; modeling network performance for at least some the plurality of different projects and associating a modeled network performance with an origin date in the computer storage medium; identifying, using one or more computers, each instance where a datum of the one or more network relevant data is different for different projects; and updating modeled network performance for one or more of the at least some of the plurality of different projects modeled in the modeling step, that utilized a datum of the one or more network relevant data identified to be different in the identifying step using datum having a latest associated origin date.

According to still another aspect, the computer implemented method further comprises a step of predictively modifying one or more measurement data included in the one or more network relevant data based on one or more network asset changes, the one or more measurement data having associated therewith a new origin date of when modification was performed.

According to still another aspect, the computer implemented method is such that the one or more network asset changes include at least one of changing asset transmit power levels, adding or removing signal amplification or dampening assets, changing the type of measurement receiver used to collect data, changing antenna types, altering link budgets, and changing frequencies.

According to still another aspect, the computer implemented method is such that the one or more network relevant data includes GIS data.

According to still another aspect, the computer implemented method is such that the one or more network relevant data includes measurement data.

According to still another aspect, the computer implemented method is such that the one or more network relevant data includes forecast data.

BRIEF DESCRIPTION OF THE DRAWINGS

FIGS. 3-16 show simple representations of how some user interfaces or parts of user interfaces appear according to an illustrative example;

DETAILED DESCRIPTION

Figure 1:
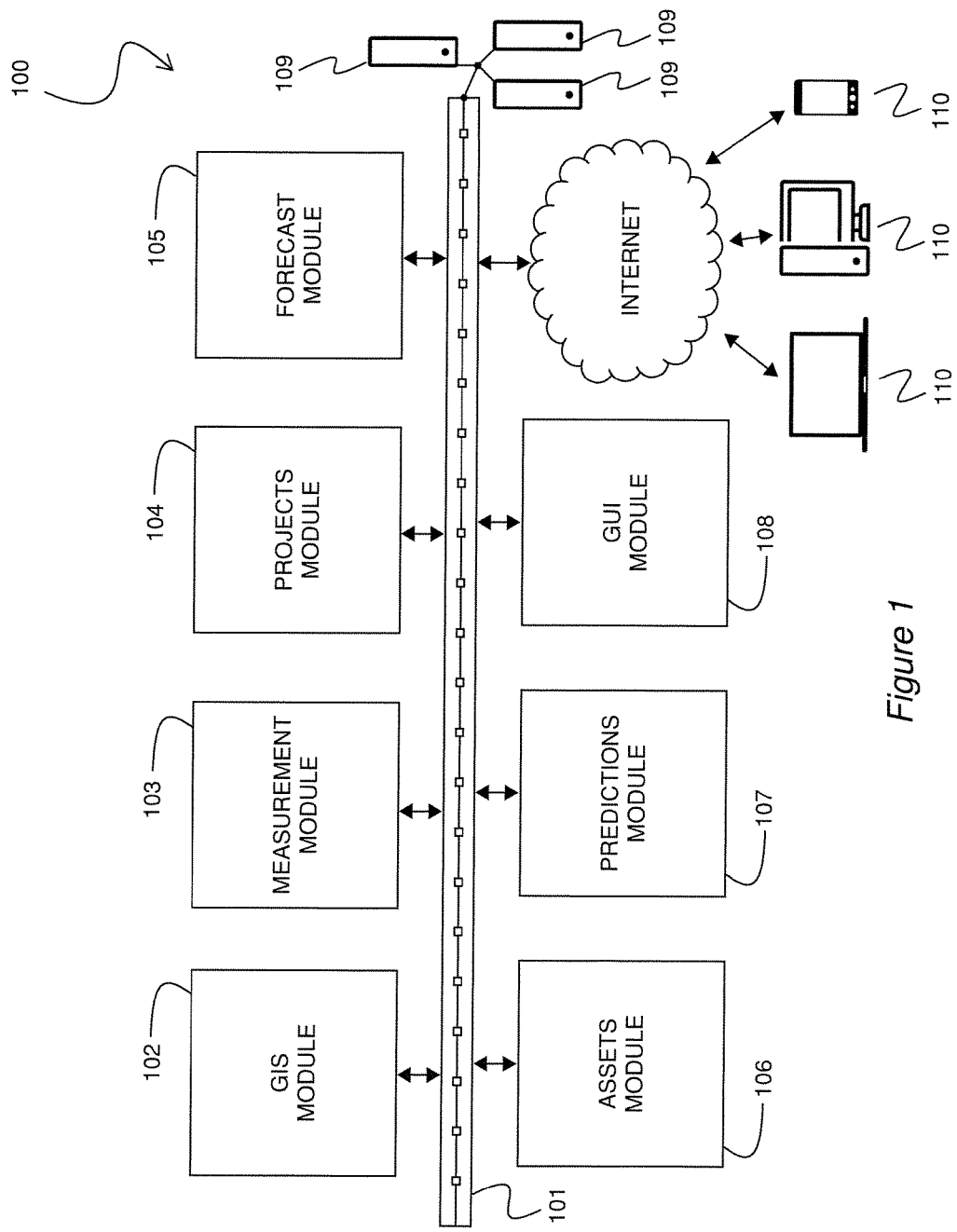
FIG. 1 is a block diagram of an exemplary system according to the invention.

The present invention provides solutions in telecommunications networks, in particular in planning and design thereof. The following are previous patents by the inventor in the same general field of telecommunications networks which are herein incorporated by reference: U.S. Pat. No. 8,503,336 ("System and method for design, tracking, measurement, prediction and optimization of data communication networks"); U.S. Pat. No. 7,773,995 ("Method and apparatus for utilizing RF signals to create a site specific representation of an environment"); U.S. Pat. No. 7,711,687 ("Method and system for using raster images to create a transportable building database for communications network engineering and management"); U.S. Pat. No. 7,680,644 ("Method and system, with component kits, for designing or deploying a communications network which considers frequency dependent effects"); U.S. Pat. No. 7,574,323 ("Textual and graphical demarcation of location, and interpretation of measurements"); U.S. Pat. No. 7,295,960 ("System and method for automated placement or configuration of equipment for obtaining desired network performance objectives"); U.S. Pat. No. 7,286,971 ("System and method for efficiently visualizing and comparing communication network system performance"); U.S. Pat. No. 7,246,045 ("System and method for efficiently visualizing and comparing communication network system performance"); U.S. Pat. No. 7,096,173 ("Method and system for designing or deploying a communications network which allows simultaneous selection of multiple components"); U.S. Pat. No. 7,085,697 ("Method and system for designing or deploying a communications network which considers component attributes"); U.S. Pat. No. 7,055,107 ("Method and system for automated selection of optimal communication network equipment model, position, and configuration"); U.S. Pat. No. 7,019,753 ("Textual and graphical demarcation of location from an environmental database, and interpretation of measurements including descriptive metrics and qualitative values"); U.S. Pat. No. 6,973,622 ("System and method for design, tracking, measurement, prediction and optimization of data communication networks"); U.S. Pat. No. 6,721,769 ("Method and system for a building database manipulator"); and U.S. Pat. No. 6,625,454 ("Method and system for designing or deploying a communications network which considers frequency dependent effects"). The following are previous pre-grant publications by the inventor in the same general field of telecommunications networks which are herein incorporated by reference: U.S. P.G.Pub.No. 20090081956 ("Assisted measurement survey of a wireless communication network"); U.S. P.G.Pub.No. 20070099622 ("Method and apparatus for utilizing RF signals to create a site specific representation of an environment"); U.S. P.G.Pub.No. 20060116853 ("Textual and graphical demarcation of location, and interpretation of measurements"); U.S. P.G.Pub.No. 20050265321 ("System and method for design, tracking, measurement, prediction and optimization of data communication networks"); U.S. P.G.Pub.No. 20050043933 ("System and method for efficiently visualizing and comparing communication network system performance"); U.S. P.G.Pub.No. 20040181374 ("System and method for creating a formatted building database manipulator with layers"); U.S. P.G.Pub.No. 20040177085 ("Method and system for using raster images to create a transportable building database for communications network engineering and management"); U.S. P.G.Pub.No. 20040162840 ("System and method for a three dimensional database modeler for wireless communications network management and engineering"); U.S. P.G.Pub.No. 20040133415 ("Method and system, with component kits, for designing or deploying a communications network which considers frequency dependent effects"); and U.S. P.G.Pub.No. 20020077787 ("Textual and graphical demarcation of location, and interpretation of measurements").

As used herein, "user" refers to a human interacting with or using an embodiment of the invention. Generally, a user will be an engineer, manager, or other persons employed by or involved with telecommunications companies tasked with telecommunications network design and deployment. A user will generally be a member of a design team working on a given project.

"Assets" as used herein refers to telecommunications assets, defined as physical property that includes electrical hardware that contributes one or more functions to the network. Examples of assets are base stations, switches, routers, hubs, computers, test equipment, antennas, connectors, splitters, probes, repeaters, extenders, transceivers, access points, virtual computing environments, and towers, and may also include collections, combinations, or groups of assets. Land in-and-of-itself, intellectual property, and other forms of "property" which are not physical property that includes electrical hardware are not "assets" as used herein except where the word's specific context in the disclosure explicitly states otherwise.

A "project" as used herein is a collection of one or more actions, activities, resources, and/or events generally related to accomplishing one or more tasks within a finite time frame that are related to or associated with the performance of a telecommunications network. A few examples of projects are a drive test measurement campaign in Charlotte, N.C. to validate network performance following the addition of new network assets; a new macro tower site expansion on Long Island, N.Y.; and an inbuilding network in Round Rock Outlet Mall in Round Rock, Tex.

"Geo-coded" is an adjective used herein to indicate that the noun it modifies, usually a datum or data of a particular type (e.g., asset data, GIS data, measurements data), is paired with geographical location information identifying a geographic point (e.g., latitude and longitude and elevation, physical address, etc.) with which the noun (e.g., the datum or data) is associated. As an example, a measurement of signal strength is always geo-coded to identify a particular geographic location where that measurement was taken. Asset information such as the specs of a base station is geo-coded so that it is possible to pinpoint exactly where the base station is physically located. Location information may be absolute (e.g., latitude, longitude, and elevation together may provide an absolute geo-coded position requiring no additional information in order to identify the location), relative (e.g., "2 blocks north of latitude 30.39, longitude −97.71 provides position information relative to a separately known absolute location), or associative (e.g., "right next to the copy machine" provides location information if one already knows where the copy machine is; the location of the designated reference, in this case the copy machine, may itself be absolute, relative, or associative).

"Network" is defined as a collection of one or more assets, equipment, and devices which are connected so as to enable communication across or between different points. "Network", as used herein, refers to one or more telecommunications networks. The "shared timeline" may in some embodiments be referred to as a "global timeline". "Global" is an adjective which can but does not necessarily mean pertaining to the entire globe or Earth's surface. Generally, unless the word's context explicitly states otherwise, "global" as used herein is intended to mean pertaining to an entirety of a telecommunications network. For example, AT&T Inc., T-Mobile, and Verizon Communications Inc. are all telecommunications companies which individually may have networks limited to North America. However, it is possible that a single network may cover an entirety of the Earth's surface.

"Network performance" may be measured and described according to a number of different metrics. Where network performance is described by a model that predicts or simulates network performance (e.g., at a future date), the results generated by such model or simulation are "prediction data". Network performance may be characterized in terms of, for example, received signal strength, best server, throughput, error rates, packet latency, packet jitter, symbol jitter, quality of service, security, coverage area, bandwidth, bit error rate, packet error rate, frame error rate, dropped packet rate, dropped call rate, queuing delay, capacity, signal level, interference level, round trip time, bandwidth delay product, handoff delay time, handoff frequency, signal-to-interface ratio, signal-to-noise ratio, call quality, link budget, Eb/No (average bit energy/noise), Ec/Io (average chip energy/interference plus noise), physical equipment price, and cost information.

"Network relevant data" is data/information that is recognizable to one of skill in the art as having relevance and potential use in determining or rationalizing network performance. Network relevant data includes but is not limited to geographic information system (GIS) data, measurement data, project data, asset data, forecast data, and prediction data.

Examples of GIS data includes but is not limited to elevation, land-use, clutter, building vectors, floorplans, traffic, population density and demographics, and network subscriber locations and densities.

Examples of measurement data includes data describing network performance, e.g., data describing one or more of received signal strength, best server, throughput, error rates, packet latency, packet jitter, symbol jitter, quality of service, security, coverage area, bandwidth, bit error rate, packet error rate, frame error rate, dropped packet rate, dropped call rate, queuing delay, capacity, signal level, interference level, round trip time, bandwidth delay product, handoff delay time, handoff frequency, signal-to-interface ratio, signal-to-noise ratio, call quality, link budget, Eb/No (average bit energy/noise), Ec/Io (average chip energy/interference plus noise). Measurement data sources include, for example, live monitors (live monitored data), probes (probe data, and drive/walk tests (drive/walk test data). Measurement data from different projects or across different regions may be pooled and assessed for additional usability in other markets. For example, drive test data from different but geographically similar regions may be used to calibrate predictive models for that type of shared environment. Measurement data is aligned with the shared timeline. Each measurement point has a time of creation. Options may be provided for managing seasonal measurement data (e.g., winter, summer). Options may be provided for managing special event data (e.g., annual major sporting event). Options may be provided for setting time-based age-out options whereby potentially stale measurement data is flagged and/or automatically removed from the system.

Examples of project data includes project type or category (e.g., measurement campaign, new tower site, maintenance, configuration change, etc.), project states and/or status, project dates (e.g., start dates, completion dates, commitment dates, other dates or deadlines on which events for the project occur, etc.), human resources (e.g., team members or personnel), project ownership, project contact information, geographic region for project, resources allocated to the project (e.g., equipment, budget, etc.), dependencies on other projects, and project priority.

Examples of asset data includes equipment type, location, logical network address, configuration settings, owner or person responsible for the asset, service dates, maintenance history, orientation (e.g., orientation of a directional antenna), physical or logical links or connections to other assets, and dependencies on other assets.

Examples of forecast data includes forecasted per subscriber data usage, call rates, call durations, anticipated changes in GIS data, and changes in total number of subscribers in a particular geographic region.

Predictive or prediction data is equivalent to simulated measurement data. That is to say, predictive data is data representing network performance on one or more dates (typically one or more dates in the future) generated by network performance modeling (e.g., network performance modeling of a predictions module).

According to an exemplary embodiment, a cloud-hosted platform (generally referred to herein as "the platform" or "the system") is provided which enables a centralized combination of network design and deployment tools. Tools in the prior art are separate and independent and therefore of more limited functionality. A combination of multiple tools produces new functionalities and features made possible by the combinations taught herein.

FIG. 1 shows a block diagram of an exemplary platform 100 including a shared timeline 101, a GIS Module 102, a Measurement Module 103, a Projects Module 104, a Forecast Module 105, an Assets Module 106, a Predictions Module 107, and a GUI Module 108. The modules 102, 103, 104, 105, 106, 107, and 108 are connected with one another or may be integral. They are each also connected or integral with the shared timeline 101. The shared timeline 101 is maintained on a network of one or more computers 109 which include one or more processors, wherein responsible parties (e.g., project owners) of the separate projects can be provided access to the shared timeline through one or more electronic terminals 110 configured to communicate with the one or more computers 109 using a network such as the Internet. The use of the adjective "shared" in the term "shared timeline" connotes that the timeline shares information about multiple projects at one central location or source. Based on this definition, a shared timeline can be referred to interchangeably as a "central timeline". While the adjective "shared" in the term "shared timeline" also frequently implies that information for multiple projects is shared with multiple responsible parties, access to a shared timeline can at times be limited to a singular responsible property. Some alternative embodiments may include further modules besides those illustrated in FIG. 1, and still other alternative embodiments may include a subset of the modules illustrated in FIG. 1.

As used herein, a "module" refers to one or more programs or program blocks providing functionality or functions which are closely related. A "GIS Module" is a module where the common denominator is functionality or functions involving GIS data. A "Measurements Module" is a module where the common denominator is functionality or functions involving measurement data. It should be noted that "measurements" and "measurement data" are used interchangeably herein. "Data" and "information" are also generally interchangeable terms. Data is storable on non-transitory computer readable mediums such as hard drives, flash drives, compact disks, solid state drives (SSDs), etc. which store the data by electronic and/or magnetic means. Modules may be individual programs which communicate with one another. Alternatively, a single program may encompass some or all modules described herein. The modules may operate together on the same or different computers, and in some embodiments may be fully or partially accessible by mobile devices.

Projects and assets are reflected on a shared timeline 101. The shared timeline 101 is a computer representation of a chronological sequence and may take a variety of different forms including without limitation pictorial (e.g., graphical), tabular (e.g., spreadsheet), numerical, or some other format. The shared timeline 101 includes all planned and committed network changes as per the various ongoing or planned projects. The shared timeline is populated with multiple projects. Project information may be extensive, but some examples are geographic location, new or changed assets, estimated project start date, and estimated project end date. For some project dates such as project start dates or project completion dates, a range of dates may be provide. For instance, a project may start anytime a window of time consisting of a week, a month, a year, or some other grouping of a plurality of dates. That window of time is the project start range. A project includes information such as project type or category, project dates such as project start dates (i.e., date when company personnel are slated to begin work on the project), project commitment dates (e.g., when the company makes a final decision and commits to the installation of new assets associated with a particular project), project completion dates (e.g., when the new assets are online and affecting network performance and coverage, or when the personnel from the design team are free to shift their time and energy to another project), and a project state or status (e.g., the current status of a project such as an indication of whether it is on schedule, whether the project is underway, and/or whether the project is completed). In some instances, a project completion date refers to completion of an entirety of a project. In other instances, a project completion date refers to completion of a portion or part of an entirety of a project. For instance, if a project is the installation of three new towers, the project may have a completion date indicative of the finished installation of just the first tower while the other two towers are still incomplete. It has another separate completion date for when all three towers are finished being installed.

Projects may also involve monitoring the predicted and/or measured performance of a particular location or area. For instance, a project may be created to monitor a particular location or area within the modeled physical space; whenever either new measurement data is recorded nearby that varies from previous readings by a configurable margin or whenever predicted performance nearby varies from previous predictions, the owner of the monitoring project can be notified.

Figure 2A:
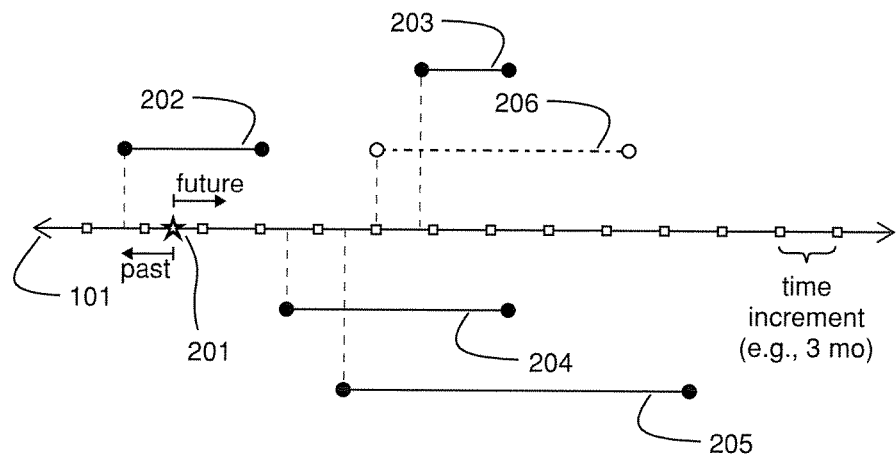
FIGS. 2A and 2B are schematics of project timelines with respect to a shared timeline.
Figure 2B:
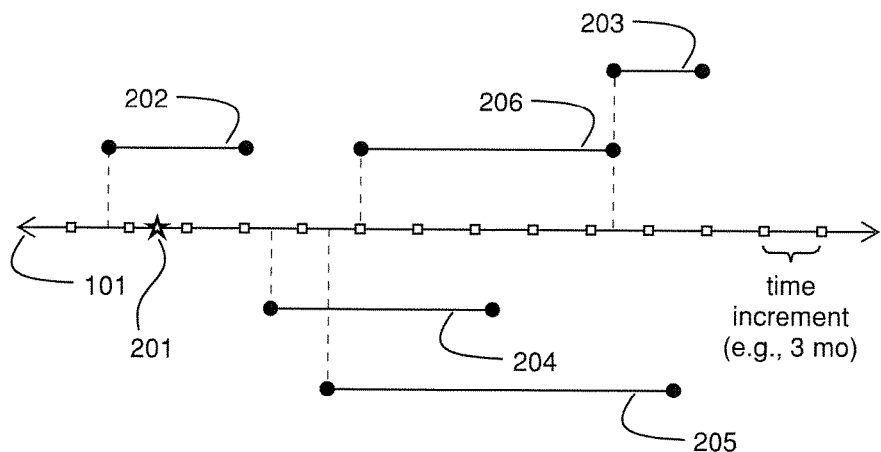

FIGS. 2A and 2B are schematic representations of a segment of shared timeline 101 populated by several projects. The x-axis represents time, with the star indicium 201 representing the present day. The amount of time represented by a unit of length in the x-axis is variable. For convenience of discussion, the figure will be treated as though the distance/length between any pair of adjacent boxes on the shared timeline 101 is equivalent to three months. Vertical (y-axis) displacement of the lines in FIGS. 2A and 2B is simply for clarity of illustration to prevent the lines from obscuring one another. Each new project includes a project timeline that branches off of the shared timeline at one or more points determined by the project owner. In the figure, project timelines 202, 203, 204, and 205 all branch off the shared timeline 101 at the scheduled start dates for the respective projects. The branching is represented by the vertical dashed lines connecting each of the project timelines with the shared timeline 101. FIGS. 2A and 2B are intended to provide examples of a variety of project timing scenarios. For example, the project with project timeline 202 is a project that is underway on the present day (star indicium 201).

Where on the shared timeline 101 a project branches off determines what additional assets or asset changes are accounted for as of a given future date. For example, a project with project timeline 204 is expected to start in six months from the present (star indicium 201). may Therefore, the start of project timeline 204 branches off the shared timeline on a date six months into the future. Importantly, when network performance is modeled for the date six months in the future (that is, the expected start date of project timeline 204), the modeling is based on (e.g., factors in) the network changes brought about by the completion of the project with project timeline 202, which is slated to finish in approximately 4.5 months from the present. The modeling of network performance on a given future date includes all future planned network changes between the present (star indicium 201) and that future date.

A new branch from the shared timeline 101 for an individual project is referred to herein as a design space. Design spaces provide organizational compartmentalization of data available on the platform and a user interface tailored for work on a single project as opposed to an overview of all coexisting projects. A design space includes a project timeline (e.g., project timeline 204). Within the design space, a greater number of scheduled dates and deadlines may be included on the project timeline than are visible on the shared timeline 101. For example, the project with project timeline 202 may have a scheduled date for when hardware that has been ordered is expected to arrive. This date is made visible within the design space but may be hidden on the shared timeline. This would be at the discretion of the team members with administrator rights to that particular design space.

Changes made within a design space and to the project timeline thereof are initially only reflected on the project timeline (without being made visible on the shared timeline 101). They are then uploaded, either manually or automatically, and merged to the shared timeline. For example, a designer planning for new tower sites may iterate through multiple designs and predicted performance scenarios before settling on a final design. The design space allows for performing the iterative tests without impacting the shared timeline until the final design is selected. In other words, according to an exemplary feature, non-existing assets are not generally reflected on the shared timeline 101 until they are committed. To illustrate this feature, FIG. 2A shows a project timeline 206 which has not yet been committed and therefore uploaded to shared timeline 101. This is represented in FIG. 2A by representing project timeline 206 with broken lines and empty start/end points. This project timeline 206 is only visible to the designer and other designated users with access to the specific project (as opposed to general access to the shared timeline 101). Upon committing the project, the project timeline 206 is uploaded/synced to the shared timeline 101 as is shown in FIG. 2B, where project timeline 206 is now represented in a solid line with filled start/end points. At this point, users with general access to the shared timeline 101 are easily made aware of the next slated project. In this example, the project owner for the project with project timeline 203 decides that her project needs to be postponed until after the project with project timeline 206 is completed. Therefore, the dates of project timeline 203 are pushed further out into the future, as shown in the change from FIG. 2A to FIG. 2B.

The Projects Module 104 may automatically retrieve any of updates to the shared timeline and reflect these changes on a project timeline in an individual design space. For example, updated GIS information applied to the shared timeline may also be automatically applied to any branching design space and its project timeline. This "syncing" of the project timeline with the shared timeline may be manually initiated by a project owner as an additional or alternative option to the automated syncing. Updates applied directly to the project timeline concerning the project's specific deadlines do not automatically affect the shared timeline. Rather, these changes are reflected on the shared timeline based on the decision and sync activation of the project owner.

Design spaces may also receive automatic notifications regarding downstream projects (i.e. known projects that exist at future points on the shared timeline) that will be affected by the project under design. As the design proceeds, those involved in the design project will have complete visibility into which other already committed future projects will be affected by the design decisions they are making.

Among its functionalities, the platform permits modeling of the physical environment (i.e., geography, buildings, etc.), representation of network assets (e.g., base stations and cellular towers), and execution of computer programming instructions on one or more computers (which include one or more processors) which provide simulation of how radio waves interact with the environment. Modeling of the physical environment involves generating a computerized model which accounts for landscape and structure heights, locations, distances, materials, etc. The computerized model of the physical environment is configured to allow network performance modeling and predictions to be performed thereon or with respect thereto. Procedures and tools for conversion of initial input such as satellite images (basically bitmaps of pixels) to computerized models which account for geographic and material properties of landscapes/structures illustrated in the satellite images are not in and of themselves new, and existing procedures and tools for this purpose will be known to those of skill the art.

Various outputs are provided to users of the platform including, for example, color-coded plots overlaid on maps of the environment, where the colors correspond to a wireless network performance metric. Alternative asset placements or asset configurations result in different predicted performance plots. The alternative plots and their corresponding data (i.e., plot data) enable comparison against desired network performance goals. A network design engineer may then select a preferred arrangement and configuration of assets for actual implementation and installation.

The cloud-hosted software platform 100 scales to a seamless nationwide network model. The conventional modeling and simulation systems in use as of the filing of this application require users to define relatively arbitrary bounds to limit the model or simulation to a particular geographic area representing only a small fraction of the total network area (e.g., <5% of the total network area or even <1% of the total network area). For example, a user is required to draw a polygon encompassing an individual city. Any network relevant data (e.g., asset information, measurement data, etc.) which lies outside this polygon, even just meters outside of this polygon, are entirely ignored. In reality, this network relevant data may actually impact the area of interest and yet it is excluded in conventional systems. The present system does not require fixed rigid boundaries for modeling and simulations. Rather, the models and simulations may be scaled at will, taking into account up to an entirety of network assets and network relevant data regardless of location within the network.

The platform manages data flow and message passing between modules. This may be accomplished with, for example, open communication interfaces and application programming interfaces ("APIs"). The platform includes a central database with information on all ongoing or planned projects. As used herein, a "central database" comprises a plurality of computers (e.g., servers or computers 109 in FIG. 1) networked together. Preferably, the central database is configured for transmitting and receiving data over the Internet. The computers 109 supporting the system need not necessarily be located in a singular geographic location.

The platform is configured to interact with GIS, Measurement data, Asset data, and Predictive tools to maintain predicted performance estimates across all projects, assets, and the shared timeline 101. Multiple project teams involved in network build-out and/or maintenance can interact seamlessly within the same geographic area. The platform scales to desired network scope (e.g., local, regional, or national), and aligns on-going and planned projects within the scope to the shared timeline. Each team's project details (including but not limited to duration, location and area, and assets) are all tracked, with cumulative impacts on overall network performance continually maintained. Potential conflicts between teams may be identified in advance and mitigated. Project owners may be notified of any significant network changes at any point in the future on the shared timeline that may impact one or more of their on-going or planned projects. The platform has a multitude of advantages, including improved project and budgetary planning, reduce over-build with assets potentially rerouted as needed, reduced re-work caused by conflicting assets or project teams, rapid assessment of network outage events and network impacts, and preemptive conflict detection resulting in greater mitigation time.

Project team utilization is tracked on the shared timeline. The extent to which individual project teams are booked (e.g., heavily booked, lightly booked) is conveyed to users of the system in connection with the shared timeline. The user interface for the shared timeline may include filters so that the content of the shared timeline may be filtered by individual project teams or a project category display allowing for projects to be grouped by type (e.g., measurement survey, new asset deployment, etc.) to be shown in parallel. If/when projects slips, the owning team(s) are provided the ability to update the changed project timeline and sync it with the shared timeline. The impacts of the slipped deadlines trigger an automatic waterfall of updated network performance predictions moving forward along the timeline. Flags are triggered to highlight risks to future planned projects owing to, for example, teams being overbooked. The platform, which maintains as part of project data information concerning the personnel assigned to a particular project, identifies teams which may have overlapping projects noted on the shared timeline. Because predicted performance is being regularly maintained for the entire network, it is easy to assess performance tradeoffs in either assigning projects to different teams, or pushing projects out in time.

"Flagging", as used herein, may be or include changing a project state to convey a change in a project status. For example, a project state may include labels (e.g., words or color-codes with a key describing the color codes) such as "At Risk" or "Flagged" or "Red" (if the predicted performance is outside goals recorded in storage media of the platform), "Green" or "Good to Go" or "On Track" (if the predicted performance remains within goals), "Yellow" or "In Jeopardy" (if the predicted performance is within a certain range of the goals), etc. Past projects, present projects, or future projects are all capable of having project states. A past project (e.g., a project which has been completed) may have a project state that indicates whether design goals of the project continue to be met. A network-impacting event or completion of another project may trigger a change to the project state of a completed project. If the design goals or outcome of a completed project are compromised or invalidated by a later network-impacting event or some other project, the responsible party for the completed project is notified. The completed project can be reopened, or a new project can be created to address the project state change of the completed project.

GIS data may be processed and handled by a GIS Module 102. Updated GIS data may be maintained by the platform independent of user intervention. The platform may be connected (e.g., configured to exchange data with) or integrated with a one or more of a plurality of GIS data sources, including cloud-hosted (e.g., web- or internet-hosted) GIS databases and file-based GIS sources. A wide range of GIS data are supported, including but not limited to elevation, land-use, clutter, building vectors, floorplans, traffic, population density and demographics, and subscriber locations and densities. The platform may be configured to automatically detect the existence of updated GIS data (e.g., by checking/querying the host servers of cloud-hosted GIS databases) and import the latest updated GIS data automatically (i.e., without human user intervention). Third party GIS sources may also generate notification(s) received by the platform at one or more servers which, in response, request and then receive and store the updated GIS data for which the original notification(s) were generated. An option for a user to manually update the platform's GIS data may additionally be included.

Furthermore, anticipated changes in GIS that may occur in the future may also be leveraged by the platform. For example, if a new housing development or apartment complex is zoned and approved by a locality, at that point in time the development is completed the current GIS information for the site (e.g., "farm land") will transition to its new form (e.g., "dense residential housing"). The GIS Module 102 allows for future GIS data changes to also be reflected on the shared timeline. For example, the updated GIS data surrounding a residential housing development may be entered on the shared timeline nine months in the future. It will then be automatically considered and factored into projects on the shared timeline, both from that point in time forward and also for archived projects if desired.

Upon or after receipt of updated GIS data, the updated GIS data is analyzed for changes from prior GIS data. This may include, for example, changes in buildings, population, land-use (e.g., the "farm" is now a "football stadium"), and resolution. The GIS Module 102 identifies projects, assets, measurements, and predictions (e.g., which populate the shared timeline) which are impacted by the changes introduced by the updated GIS data. Impacted measurement data is aged-out or invalidated based on GIS changes. The GIS Module 102 triggers a refresh (e.g., new iterative execution) of one or more prediction tools to refresh performance estimates for impacted areas across the shared timeline.

As needed, the GIS Module 102 may convert updated GIS data that has been received into various formats or representations for compatibility with the prediction tools or other modules. More example, updated GIS data may be converted into internal merged indoor-outdoor data representation. GIS data may include, for example, building floor plans. The updated GIS data may be automatically processed via preconfigured rules in the GIS Module 102 for passing along the updated GIS data as inputs to predictive tools.

Measurement data is processed or handled by a Measurement Module 103. The platform may be connected (e.g., configured to exchange data with) or integrated with a one or more of a plurality of third party measurement providers. This may be accomplished using open APIs. The measurements may include but are not limited to live monitored data (e.g., from phones or networked devices which measure and report signal availabilities and bandwidth), probe data, monitored network and network asset operational data and configuration data, and drive/walk test data. The platform may also regularly or continually access cloud-hosted measurement databases such as is provided by wireless analytics companies such as Gladiator Innovations LLC, ZK Celltest, and Nexgen Wireless. Measurement data is commonly in proprietary formats. The Measurement Module is configured to accommodate bulk storage of proprietary data formats as well as downstream processing/analysis. According to an exemplary feature, the Measurement Module processes received measurement data point-by-point (e.g., for individual latitude-longitude or otherwise geo-coded combinations and/or by sequential timestamps) for geographic positioning and graphical display. Measurement data may be passed through to predictive tools for automatic re-calibration and refresh of performance estimates. Measurement data from different design projects or across different geographic regions may be assessed for additional usability in other projects or markets (e.g., telecommunications markets). For example, drive test data from locationally different but geographically similar regions (e.g., regions in neighboring states which are characterized by very similar foothills) may be used to calibrate predictive models for that type of shared environment. As another example, drive test data collected on Mar. 24, 2015, in Raleigh, N.C., may be pooled and used together with drive test data collected on Mar. 18, 2015, in Durham, N.C., for a project having an area of interest that is the greater Research-Triangle-Park (RTP) area of North Carolina.

Measurement data is aligned with the shared timeline 101. Each measurement point has a time of creation, i.e., a date of when the datum was collected or measured. In contrast to the industry trend of using measurement data mostly if not exclusively for the project for which it was collected, exemplary embodiments disclosed herein capitalize on the recognition that most measurement data have value beyond the projects within which they are collected. In effect, measurement data is dissociated from the specific project for which it was originally collected. The platform identifies ongoing or planned projects in which previously collected measurement data (i.e., collected in a different project) may be utilized. Because GIS data changes are tracked (e.g., a new building just went up on that corner) and asset changes are tracked (e.g., a particular base station was replaced), the system has the necessary input data to assess whether a given measurement data point is valid or whether it should no longer be utilized. So instead of just discarding measurement data after every project or after a certain amount of time has elapsed, there is an intelligent assessment as to whether the data can still be considered valid (i.e., because nothing relevant to the data has changed) or should be discarded.

Measurement data may be used for a variety of purposes, including one or more of predictive tool calibration, alarm generation (e.g., for low network performance), and interference assessment, among other functions. Conventionally, measurement data was collected and used for only one of these purposes and then discarded. As an example application of the present invention, drive test data collected for interference readings may subsequently be used to calibrate predictive tools. The platform aligns each measurement datum received into the system with the shared timeline according to its creation date (i.e., when the measurement reading was taken). Each measurement datum is paired with data providing the location where the measurement reading was taken. The result is a network-wide pool of valid measurement data that may be drawn from and relied upon by various project teams. The platform may be configured to automatically identify measurement data that is useable for prediction calibration and route such measurement data to one or more predictive tools which are then automatically run and their results updated. Options are provided for setting time-based aging-out parameters whereby older measurement data is flagged and/or automatically removed from the system. The platform continually tracks system events and analyzes them to re-assess the validity of previously entered measurement data. This may involve data exchange or functional collaboration between modules such as the GIS Module and Measurement Module. As an example, GIS changes are analyzed to determine impacts on nearby measurements (i.e., measurements associated with geographic points in the geographic area of the GIS changes) to assess on-going data validity on a point-by-point basis. As an example, new or torn down buildings may invalidate measurements collected in proximity to the new or torn down buildings (e.g., within 100 m or less, within 500 m or less, within 1000 m or less). Impacted measurements may be flagged and/or automatically removed from the system, with resulting impacts to other modules (e.g., predictive tools) automatically handled. As measurement data is aged out and new measurement data collected, the platform continually feeds and re-calibrates predictive tools, which in turn refresh performance estimates all along the shared timeline.

Measurement data may also be optionally modified predictively to further extend its usefulness. A measurement data point is essentially a snapshot of network performance at a particular point in space, at a particular point in time, when the network assets affecting the measurement were in a particular configuration or operating state. Conventional wisdom follows that any change in the configuration or operating state of an asset involved in the measurement data most likely results in the measurement data being invalid; that is, if a change is made to an asset and a new measurement was taken at the same location as the previous measurement, the new measurement data would be different, reflecting the change in the assets involved. Therefore, any change in network assets generally results in prior measurement data being discarded.

However, the platform is able to apply more intelligence to this process by understanding what changes were made to network assets and assessing whether those changes truly invalidate prior measurement data. Predictive modification of measurement data based on knowledge of network asset or infrastructure configuration changes offers an opportunity to further extend the life and usefulness of measurement data. If a change in an asset is such that the platform can, with a high degree of confidence and certainty, predictively modify the prior measurement data to then represent the change to the asset, then it can optionally do so on a point-by-point basis. For example, if the only change to an asset is an increase or decrease of transmitted power, then one can confidently assume the only change to measured received signal strength will be a corresponding increase or decrease of received power, as all other variables are assumed constant. As such, the platform may modify prior measurement information to reflect the new, current asset configuration as if the asset had that configuration at the point in time the prior measurement data was collected. Modified measurement data may then be considered valid for future usefulness. Examples of network asset changes that may allow for this predictive modification of existing measurement data with a high degree of confidence include changing asset transmit power levels, adding or removing signal amplification or dampening assets, changing the type of measurement receiver used to collect data, changing antenna types, altering link budgets, and changing frequencies. Changes to network assets such as adding, removing, or moving transceiving assets may not allow for such predictive measurement modification with sufficient degree of confidence.

Because measurement data is aligned to the shared timeline with each measurement data point having a specified timestamp, measurements may be associated or grouped and utilized by the platform based on temporal effects that are relevant for future utilization of the measurements. Time of day (e.g., rush hour), season of the year (e.g., winter, summer), and relationship to a major event (e.g., annual sporting event, parade, holiday, etc.) are examples of associations or groups that measurement data may form based on their position on the shared timeline. These associations or groups may also form based on concurrent projects or project events. For example, measurement data collected during a project event designating a major holiday may be automatically associated with that project event. The user of the platform may then configure the system such that predictions along the timeline are automatically updated not only for each time interval, but for each measurement data association or group at each time interval. For example, on July $4^{th}$, predicted results may be provided that utilize measurement data collected for and associated with the holiday, separate predicted results that utilize measurement data associated with the summer season, and separate predicted results that utilize general measurement data; the platform will independently assess the predicted results for each of these on the July $4^{th}$ date and provide separate assessments for whether projects are impacted.

A Projects Module 104 interfaces with project information databases. This may be accomplished using open APIs. Project information is utilized by the platform to help organize and represent internal data. Project data may include but is not limited to project owners and contact information, project reference identifiers and keywords, project category or type, project description, project duration (expected start date or range/stop date or range), project resources (e.g., personnel involved), project priority, location and work area, region/market, asset interactions (placing, removing, upgrading, configuring), project dependencies (e.g., the project depends upon one or more other projects to complete within a certain time), and project state. The platform may be configured to manage project ownership. For example, project modification or deletion is restricted to project owners. The system may allow project owners to share or block read-access and/or write-access privileges with others. Projects may have a category or classification that prohibits certain users from viewing the project details. Some users without assigned access rights may be prevented from seeing that a given project exists. Projects may have an indefinite stop date, in which case they will persist on the shared timeline with automatic time extensions (e.g. the project's stop date is incremented by one day each day, one week at the end of each week, or one month at the end of each month, etc.).

In many instances, new projects are created when a user accesses the platform and provides input to the platform such as project data or a command to retrieve project data from a database. This type of project creation is referred to as a user-triggered project creation. While the platform is technically creating the new project, a user preferably must command the platform to do so with one or more inputs. In addition to user-triggered project creation, the platform also supports automatic project creation. Projects may be automatically generated by the platform in response to certain events other than a user commanding the platform to create a project. For example, a network outage event (i.e. an event where portions of the network are offline) may trigger the platform to automatically generate a project with a category of "Outage" assigned to a pre-designated owner, and which represents that one or more network assets are no longer functioning properly. The project may persist until cleared by the owner or the platform ascertains that the affected assets have returned to normal service. As another example, projects may be placed on the shared timeline to represent planned network maintenance time windows; these would allow other users to more easily plan network projects to coincide with the maintenance windows.

The shared timeline may be populated with network-impacting events in addition to projects. Major holidays or major events (e.g., festivals, sporting events, parades, etc.) in certain geographic regions may be very relevant in that the event itself may have an impact on network performance, and by representing these network-impacting events on the shared timeline allows project owners to easily account for them from a planning perspective.

User interface interactions primarily occur in the context of one or more projects. A GUI Module 108 is usable to provide user access and the ability to interact with projects and other aspects of the platform 100. Project owners can provide inputs through one or more interfaces provided by GUI Module 108 to trigger the platform 100 to create, modify, or delete projects. Projects may be plotted on the shared timeline. Projects may be plotted on a map. Projects may be plotted on a calendar. Displays may be quickly filtered by project owner and project information (e.g., category, ID, etc.). The plotted projects may be quickly filtered by project owner and project information. Color-coded displays or displays utilizing unique graphical markers or icons may be provided to quickly differentiate between concurrent projects. At any time, any authorized user can access the platform to pull up network performance plots for any area of the network at any time along the shared timeline. Those plots are generally up-to-date (e.g., not more than a week old, not more than a day old, not more than an hour old) with the most recent set of inputs (e.g., updated network relevant data). Any performance impacting changes to any project at any point on the timeline may trigger changes to the project state and/or automatic notifications that are sent to one or more project owners. For example, receipt of updated GIS data may result in revised performance estimates impacting a particular project underway and slotted to conclude in six months; the project state may be updated and the owner will be notified.

The GUI Module 108 provides access to the platform 100 on a variety of different electronic terminals 110, generally including but not limited to laptop computers, desktop computers, mobile phones, and smart watches.

Figure 4:
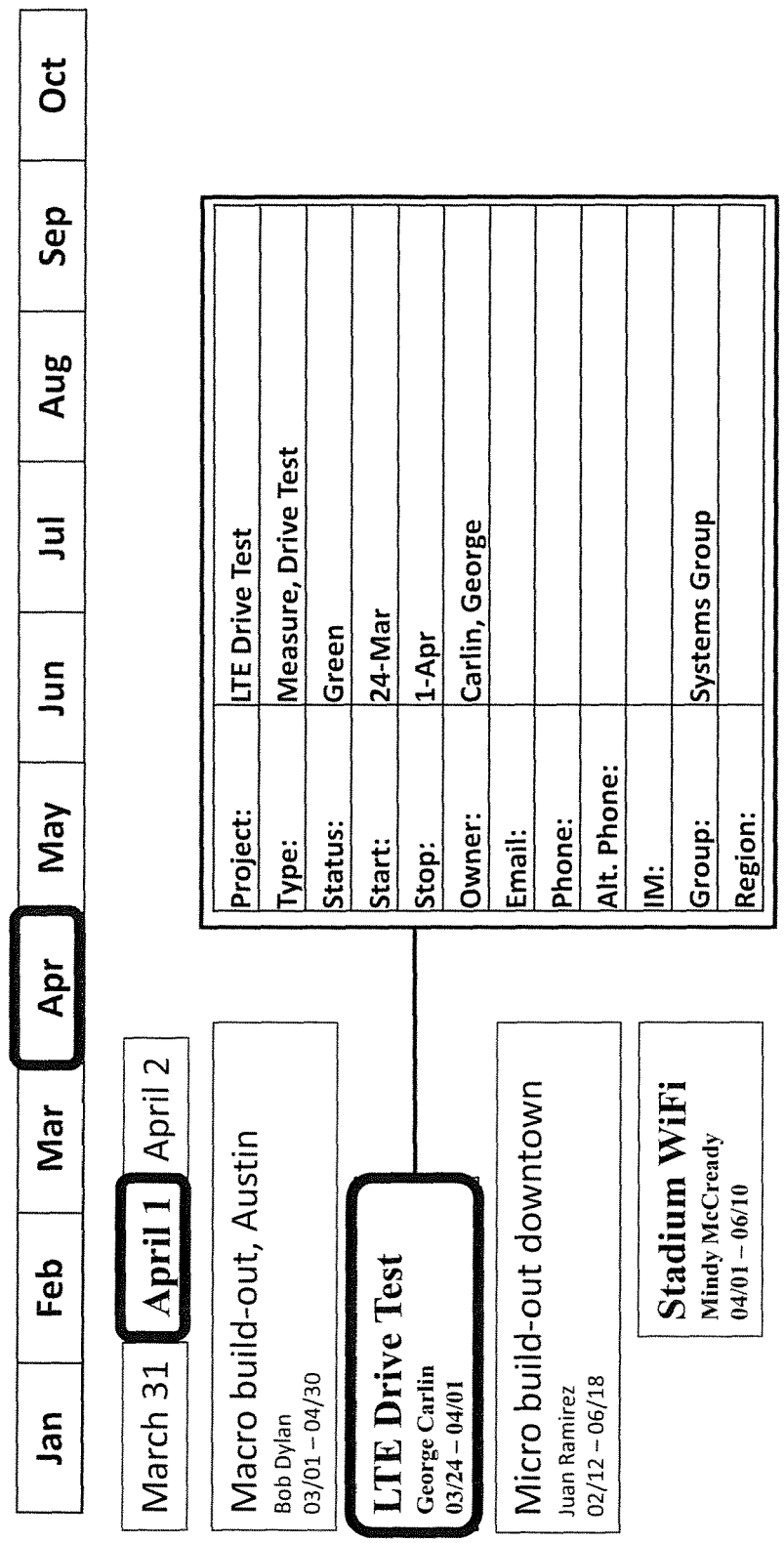
Figure 5:
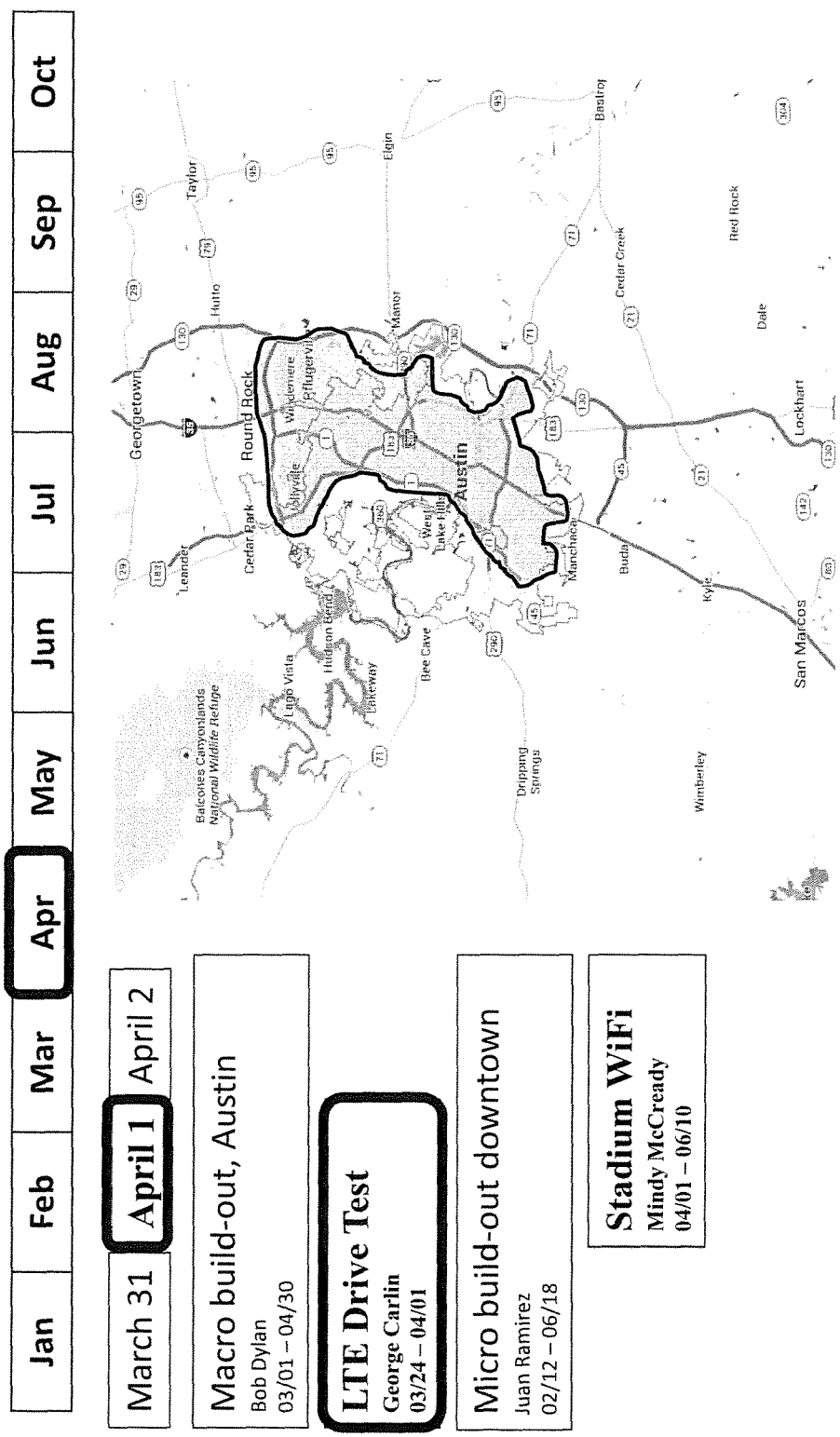
Figure 6:
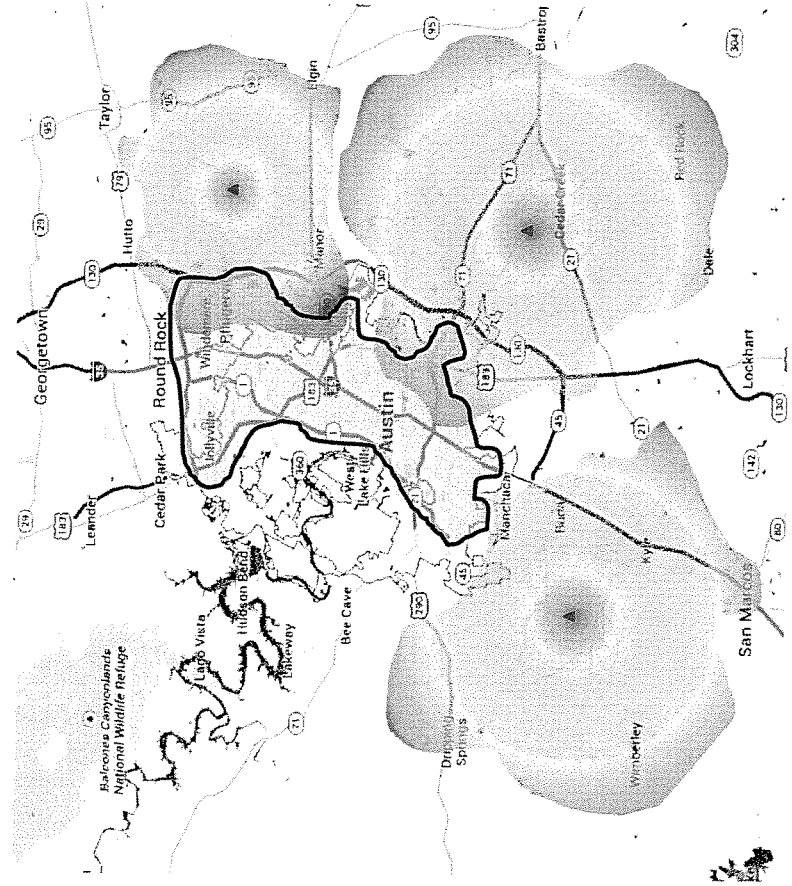
Figure 7:
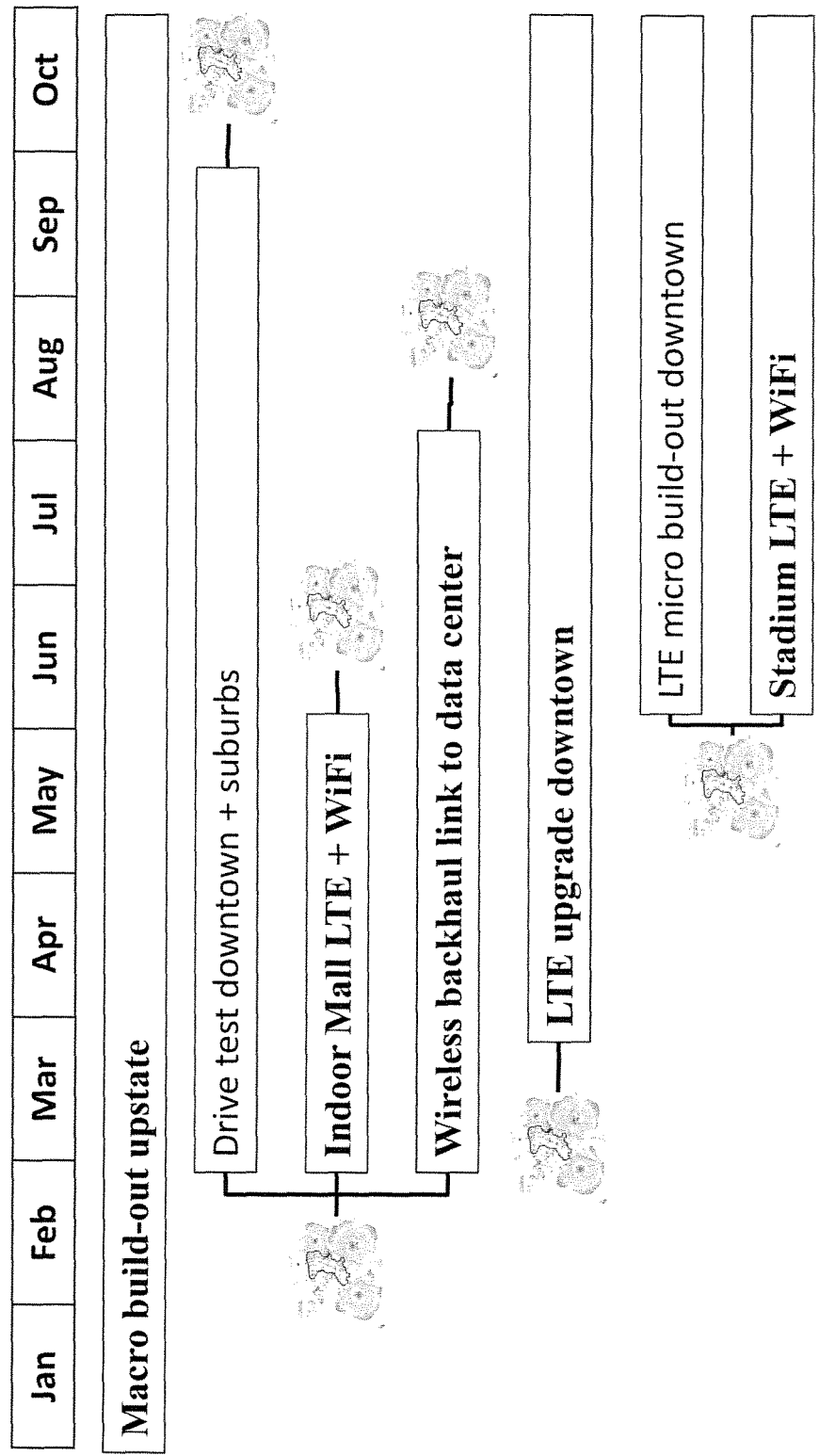
Figure 8:
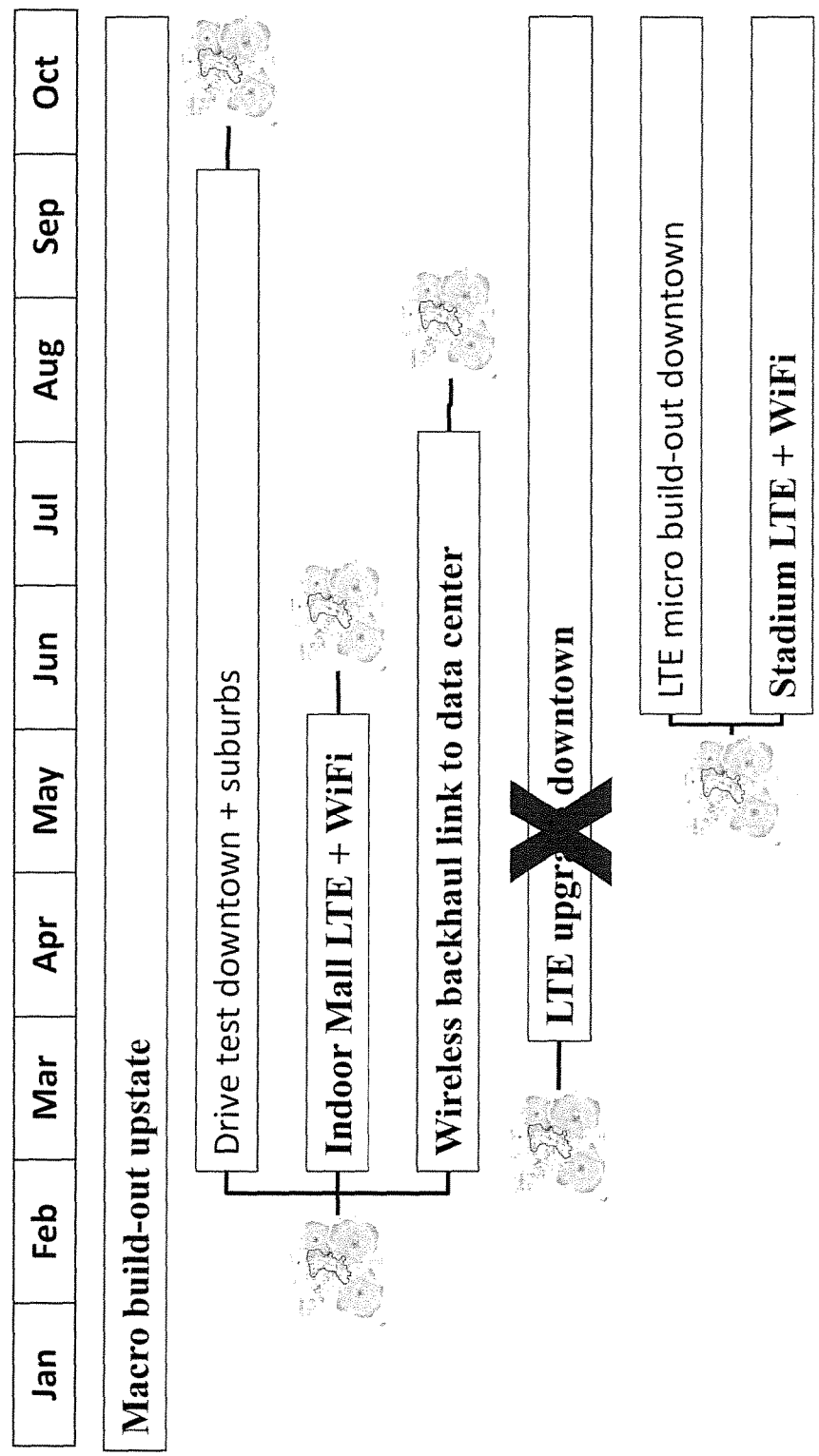
Figure 9:
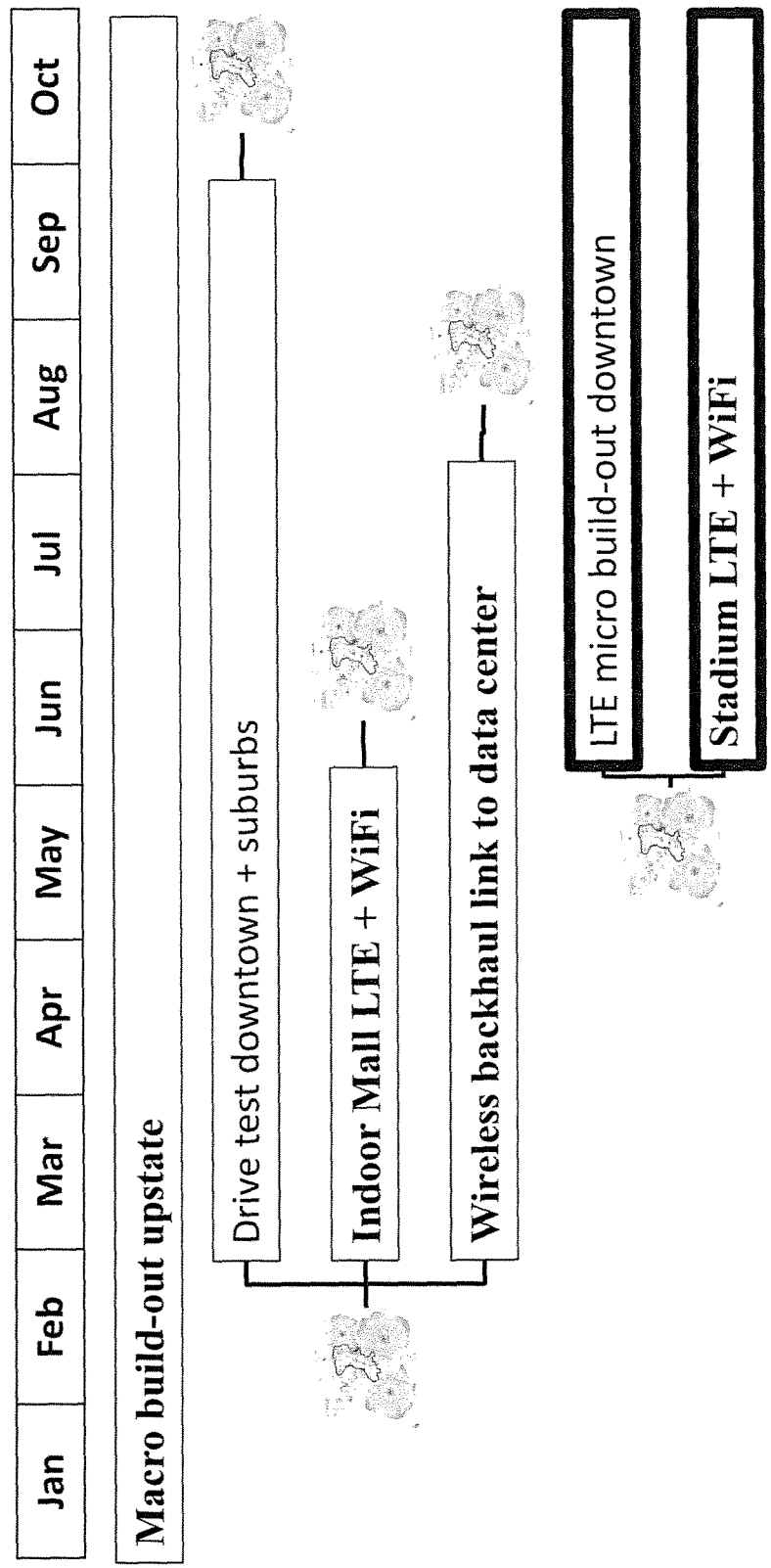

FIGS. 3-16 show simple representations of how some user interfaces or parts of user interfaces appear according to an illustrative prototype example. FIG. 3 shows an interface that includes a segment of a shared timeline populated with performance impacting projects and events. FIG. 4 shows the same interface with drill down on specific projects or date ranges. FIG. 5 shows an interface providing visual correlation of projects with an aerial map (in this case of Austin, Tex.). FIG. 6 shows an interface providing visual correlation between project assets (in this case a macro buildout of tower installations) and performance on a color-coded map. FIG. 7 shows the interface of FIG. 3, but with the additional feature of pictorial icons for predicted network performance that is continually updated all along the shared timeline to reflect each project's impact. Map views of expected performance on different dates (e.g., the present date, a future date, a past date) can be accessed using the pictorial icons which take into account one or more (up to all) projects which will have been completed and/or are underway on the selected date or dates. FIG. 8 illustrates deletion of a project (in this case a LTE upgrade in downtown Austin, Tex.). New, changed, delayed, cancelled, etc.

projects trigger automatic updates to predictions for all downstream projects. FIG. 9 shows the same interface now with the deleted project removed. Predicted performance is continually assessed as to whether project and/or network performance goals are still met. Remaining project statuses are updated and responsible parties (e.g., project owners) notified of impacted projects (e.g., negatively or positively impacted projects). FIG. 10 shows example interfaces as depicted on a smartphone 1001 or on a tablet retained in a holder/protective case 1002. In a preferred embodiment, the platform offers at least one web-based GUI to permit easy access via smartphone, tablet, laptop, or desktop. Open APIs allow for interfacing the core platform with third party GUIs as needed.

Figure 11:
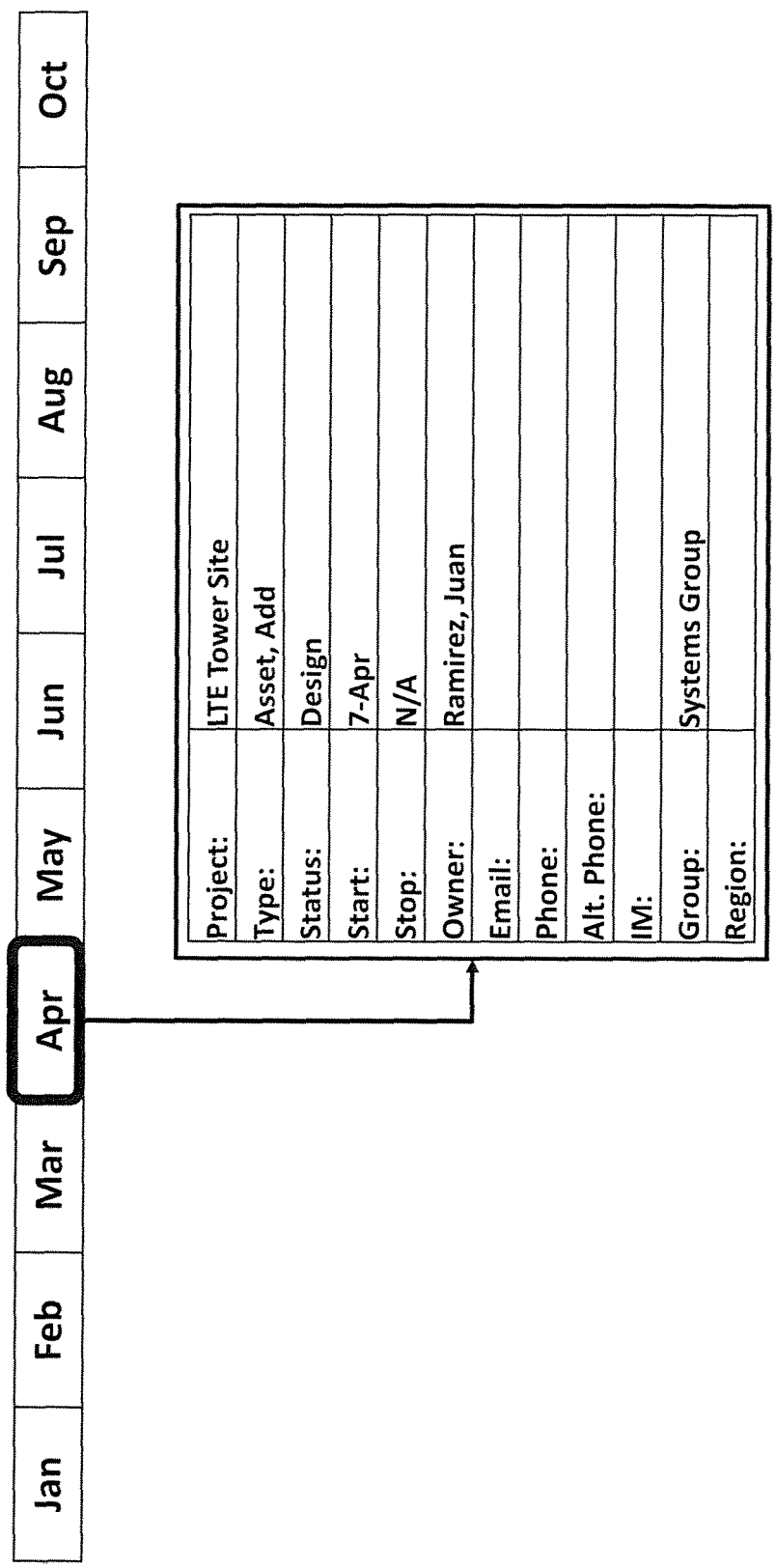
Figure 12:
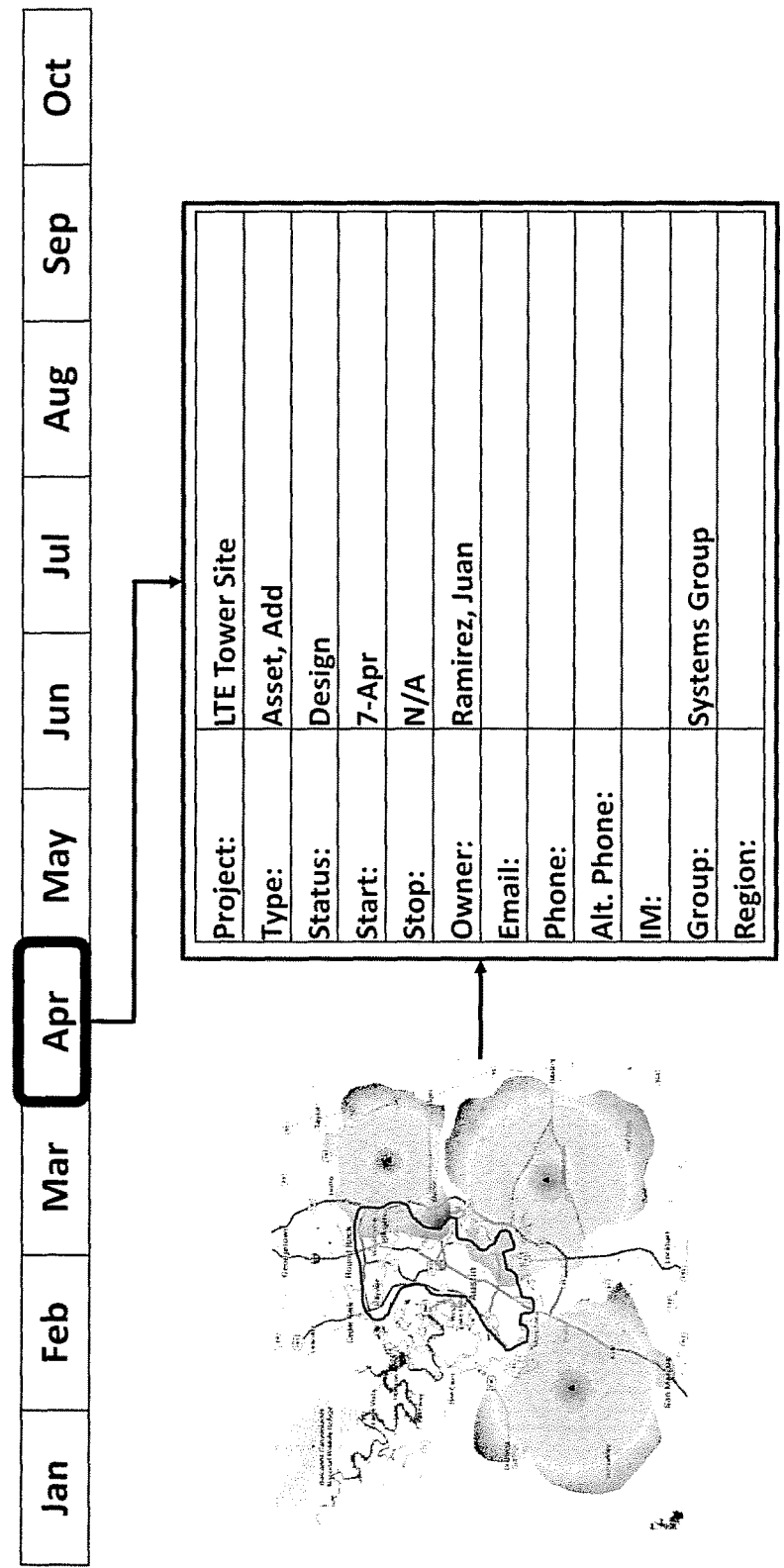
Figure 13:
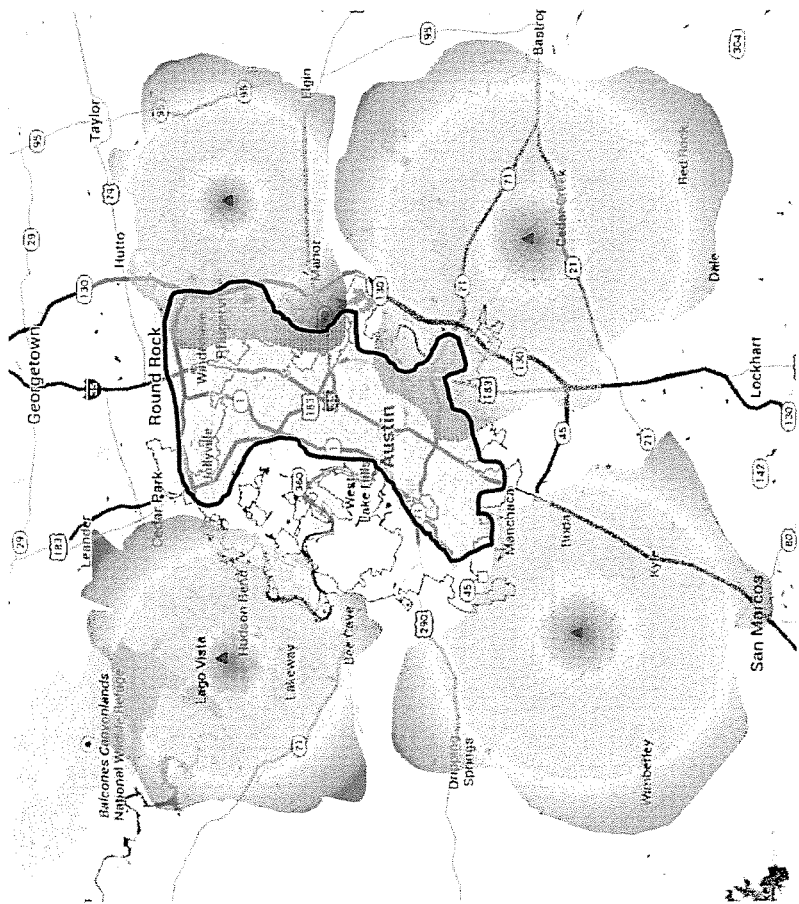
Figure 14:
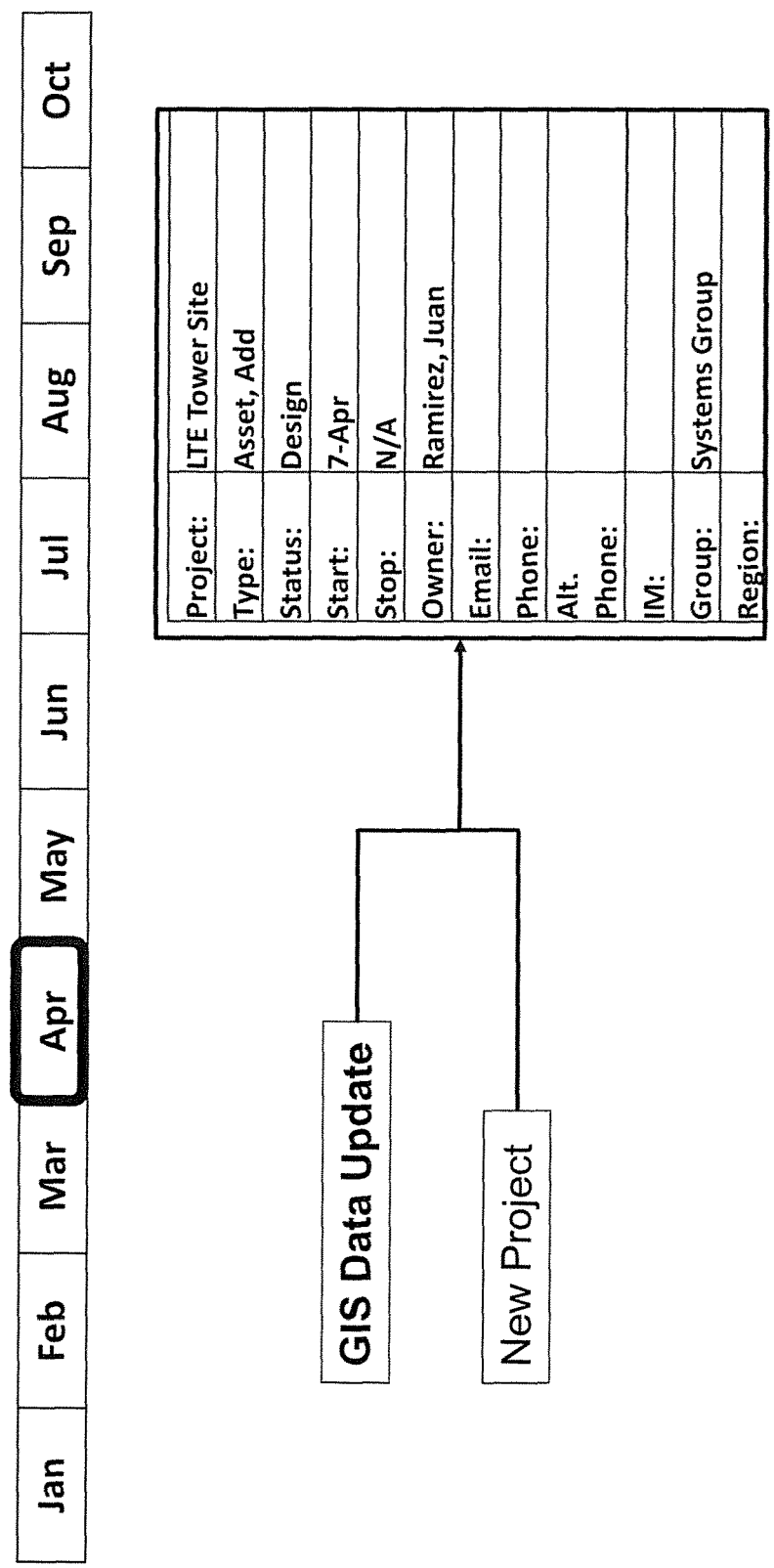
Figure 15:
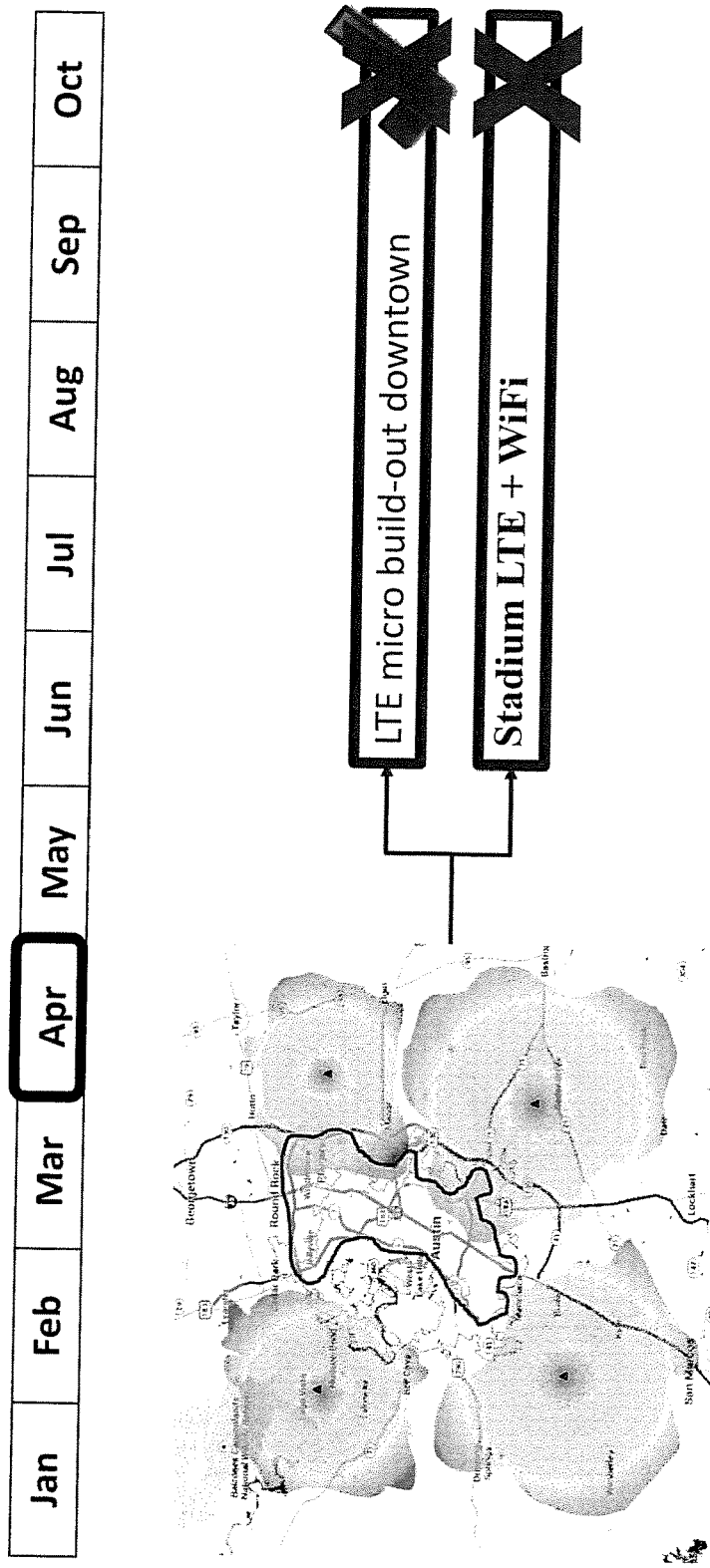
Figure 16:
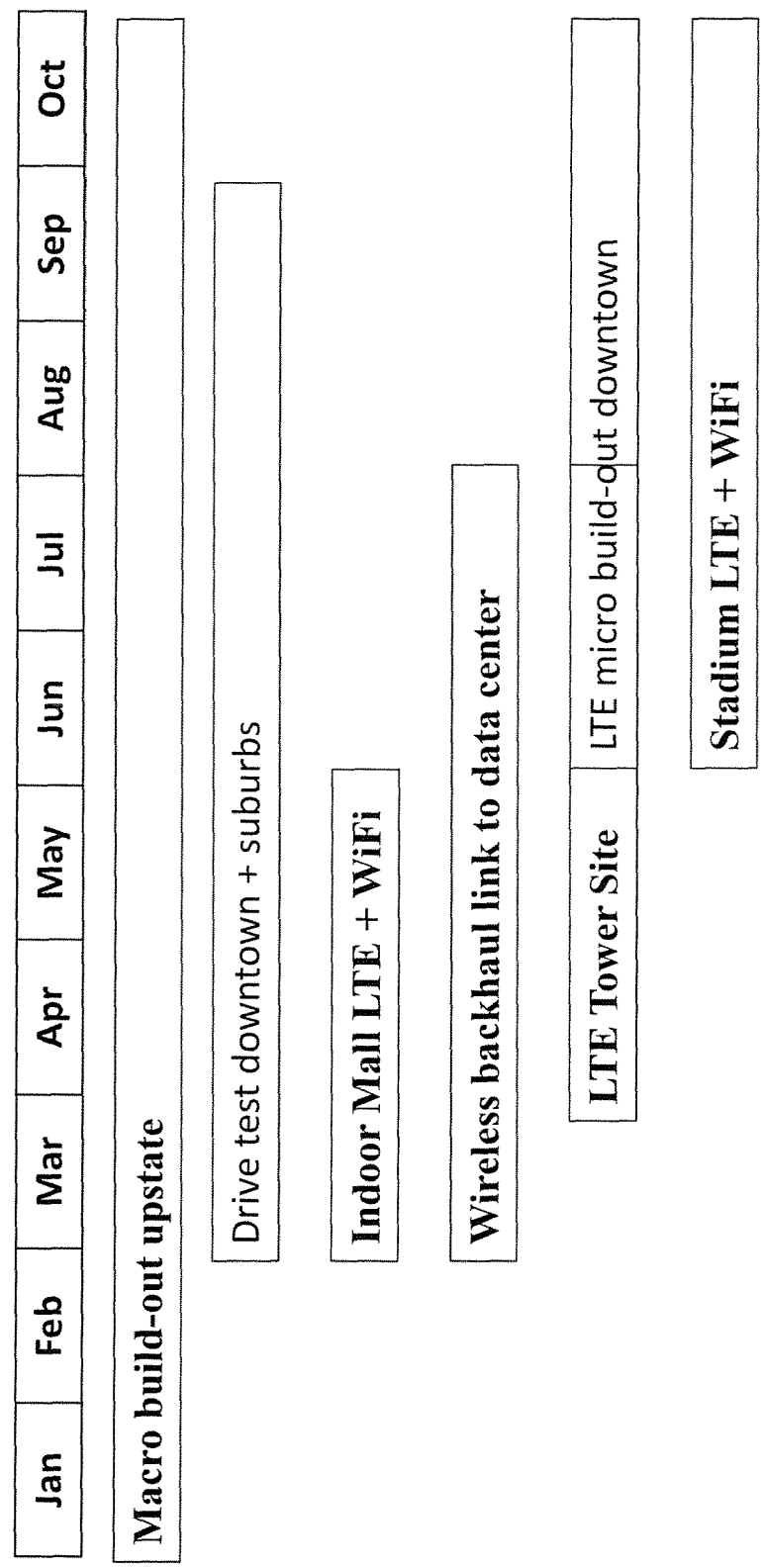

FIG. 11 returns to an interface of the shared timeline but with a table of project data for a specific selected project. New projects branch off the shared timeline at selected times. FIG. 12 shows an interface that combines the timeline and project data depictions with a performance map associated with the selected project. GIS, rules, measurements, assets, projects, etc. known during the design space timeline are automatically funneled to the new project (e.g., when the new project is created/instantiated). FIG. 13 shows an interface similar to that of FIG. 12 but which prioritizes and enlarges the map illustrating expected performance. Design proceeds normally (e.g., iterating using predictive tools). FIG. 14 shows an interface reflecting changes that may impact the selected project with a menu to access details on updated data, in this case a new project added to the shared timeline and updated GIS data. Any changes that impact the shared timeline at the point the design project was created are automatically funneled to the design space as well as reflected in the current predicted results. FIG. 15 shows an interface reflecting changes within one or more design spaces. Predicted results in the design space do not necessarily impact the shared timeline until the project design is completed. However, the design space project owner will have access to and be notified of impacts to downstream projects on the shared timeline. When the project's design is completed, the project gets committed and merges onto the shared timeline, such as depicted in FIG. 16.

It should be appreciated that FIGS. 3-16 are provided by way of example only. Other interfaces which include, none, one, or multiple features from these examples are expected in alternative embodiments of the invention.

An Assets Module 106 interfaces with asset databases. This may include the use of open APIs. The platform can utilize basic asset information needed for identification within displays and for utilizing the assets within performance predictions. Assets data may include, but are not limited to, equipment placement, type, configuration, serial number or other identifiers, current performance metrics, etc. Asset information may optionally be kept updated via access to live monitored configuration information. Future equipment identified in planned projects is maintained within internal platform data structures. As planned projects complete and new assets come online, the platform may synchronize with live asset databases to resolve new versus planned assets. Differences between planned and actual asset configurations may be flagged and notifications sent to project owner. Asset configuration changes and performance fluctuations will generally trigger a refresh of predicted performance estimates across the shared timeline.

The platform is configured to interface with $3^{rd}$ party predictive tools using a Predictions Module 107. This may be accomplished with, for example, open APIs. The predictive tools are preferably cloud-enabled (e.g., they can be accessed remotely from a standalone computer, tablet, phone, or other computing device through the internet, generally with a minimum of a login portal and access credentials) and provide modeling or simulation of network performance at a date (e.g., the present date, a future date) selected by a user. Alternatively or in addition, predictive tools may be instantiated on individual computers in a distributed form and/or instantiated on individual computers which are networked together (e.g., via a local area network (LAN)). The Predictions Module 107 is configured to provide relevant inputs to the predictive tools based on its connection with the other modules through the platform. GIS data is automatically converted via templates into formats required and recognizable by the predictive tools. Measurement data is passed through to the predictive tools for use in calibration. Assets, both existing as well as planned (but not yet physically existing), are provided to the predictive tools. Design assumptions and performance goals may be also submitted as inputs.

The Predictions Module 107 is furthermore configured to automatically trigger predictive tools to calculate or recalculate performance estimates on demand. Performance estimates are one type of predictions data. Performance estimates for every increment along the timeline may be refreshed on a continuous or repeating basis as new or updated input data becomes available to the platform. Performance estimates may also be automatically regenerated upon receipt by the Predictions Module 107 of updated predictive models or notifications that updated or replacement predictive models are available. That is to say, when modeling/simulation tools are updated, replaced, or modified, the platform reacts by initiating a new (updated) run or generation of performance estimates. Generally, after any complete run of a predictive tool, the Predictions Module 107 retrieves and analyzes the prediction results and estimates. Existing third party predictive tools include, for example, software tools from EDX Wireless, Celplan, Infovista, Forsk, and Teoco. The performance estimates are viewable overlaid on a geographic map or other forms supported by the predictive tools. The platform and/or predictive tools analyze the prediction results and estimates to determine areas of concern (e.g., where performance falls outside of acceptable pre-determined boundaries). The platform can then automatically flag impacted projects and notify project owners.

The platform captures forecast data with a Forecast Module 105 Forecast data is generally geo-coded, meaning it is associated with a defined location or geographic region. Examples include forecasted per subscriber data usage, expected call rate, expected call duration, expected types and densities of devices using the network, expected types and volume of traffic (e.g., voice over IP, streaming video, email, web browsing, etc.), anticipated changes in GIS data, and changes in total number of subscriber in a particular geographic region. Forecast data is frequently indicative of expected demands of a network on and/or after one or more future dates.

The Forecast Module 105 is configured or configurable to implement one or more rules indicating network performance requirements set by one or more users. For example, a user may enter and store a rule requiring the wireless service network for Washington, D.C., provide adequate service for the number of users expected in 5 years (e.g., it is presently the year 2015 and the forecast data indicates the number of wireless subscribers and their data usage expected in the year 2020). The Forecast Module 105 implements this rule by monitoring whether predicted network performance (i.e., prediction data) for Washington, D.C., in the year 2020 satisfies this rule or violates this rule. The Forecast Module also implements this rule by, at the deadline for a rule (in this case, in the year 2020), monitoring whether actual measurement data collected shows the rule as being satisfied or violated. The Forecast Module may generate an automatic notification or alert (e.g., transmitted to the rule maker or one or more users designated by the rule maker) when the rule is violated. The Forecast Module may also generate an automatic notification or alert when the rule is satisfied.

The present invention may include a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. 1-5 illustrate the architecture, functionality, and operation of possible implementations of systems, methods, and computer program products according to various embodiments of the present invention.

Figure 17A:
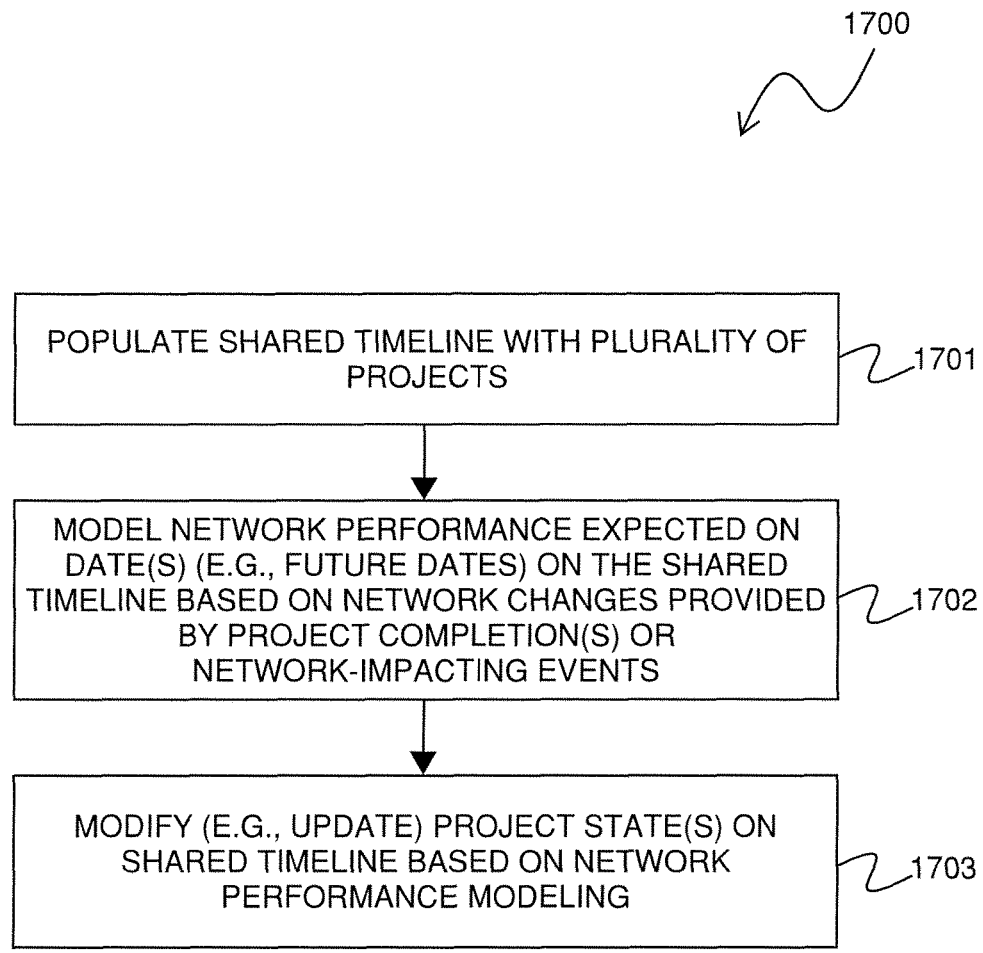
FIG. 17A is an exemplary method according to the invention.

FIG. 17A shows an exemplary method 1700 for telecommunications network design and improvement management. At block 1701, the shared timeline is populated with project states for a plurality of separate projects for network expansion and improvement. At block 1702, network performance is modeled by one or more computers. The network performance being model is the network performance expected on at least one future calendar date on the shared timeline based on network changes provided by at least one future project completion of the project completion dates. At block 1703, at least one project state that populates the shared timeline is modified based on the network performance model.

Figure 17B:
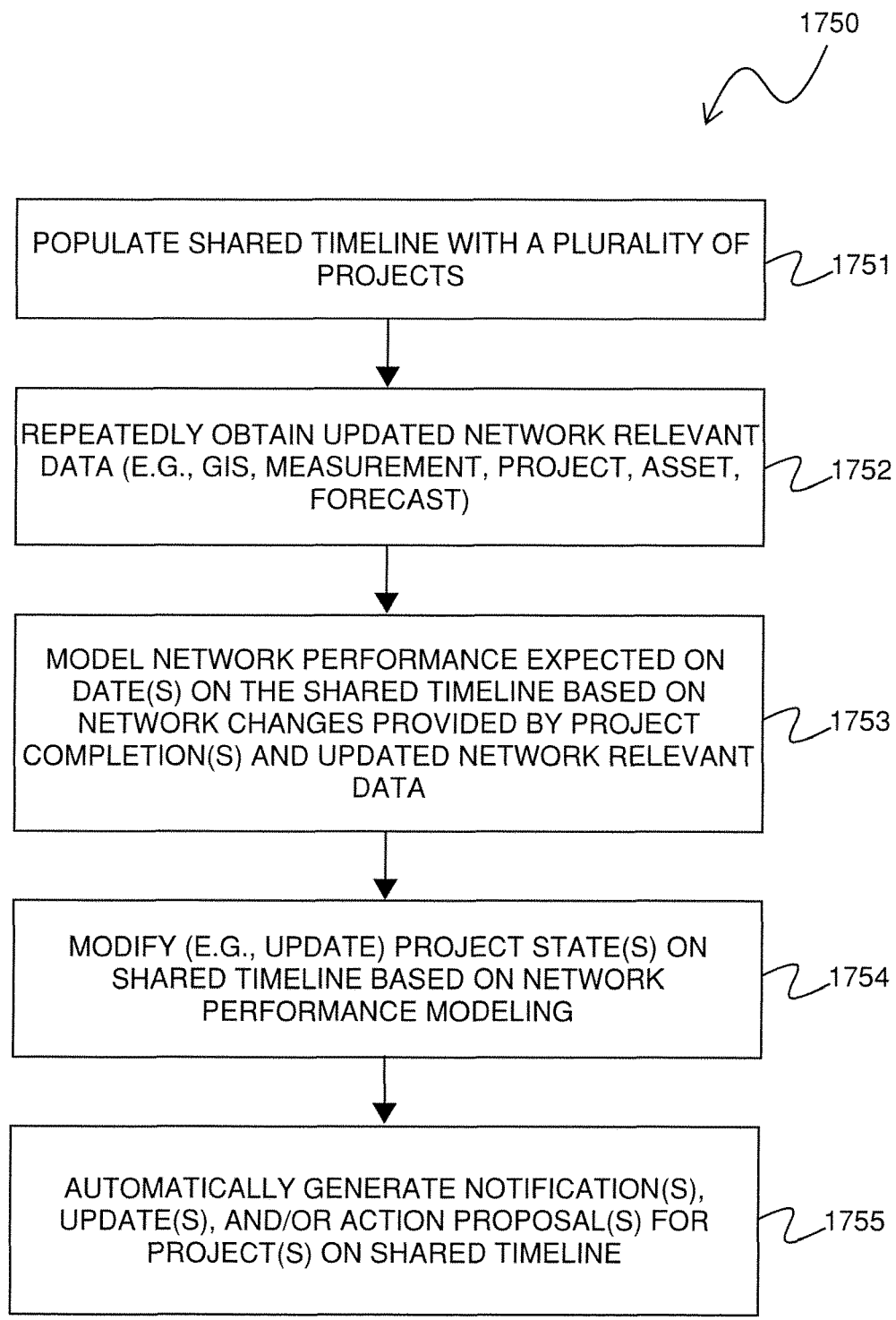
FIG. 17B is another exemplary method according to the invention.

FIG. 17B is an exemplary method 1750 for telecommunications network design improvement management. At block 1751, the shared timeline is populated with project states for a plurality of separate projects for network expansion and improvement. At block 1752, updated network relevant data is repeatedly obtained, including one or more of updated geographic information system (GIS) data, updated measurement data, updated project data, updated asset data, and updated forecast data. At block 1753, network performance is modeled by one or more computers. The network performance being model is the network performance expected on at least one future calendar date on the shared timeline based on network changes (e.g., changes in quality of service (QoS)) provided by at least one future project completion of the project completion dates. The modeling is furthermore based on network changes associated with one or more of the updated network relevant data received in block 1752. At block 1754, at least one project state that populates the shared timeline is modified based on the network performance model. At block 1755, one or more of a notification, an update, or action proposal are generated for one or more projects of the separate projects which have future deadlines on the shared timeline. The generating step is an automated response based on the network performance modeling of the modeling step.

In connection with method 1750 of FIG. 17B, repeatedly obtaining updated network relevant data at block 1752 may include obtaining measurement data collected in connection with a first project of the plurality of separate projects, and the at least one project state modified in the step of modifying at block 1754 includes a project state of a second project that is temporally parallel or subsequent to the first project, and the second project relies upon the measurement data collected in connection with the first project.

The methods 1700 and 1750 may each further include a step of obtaining one or more updated predictive models for use in block 1702 or 1753 of modeling network performance. The methods 1700 and 1750 may also include a step of automatically generating one or more projects in response to one or more events without a user command to create a new project, at least one project of the one or more projects being included on the shared timeline. The one or more events may include, for example, a network outage event.

Figure 18:
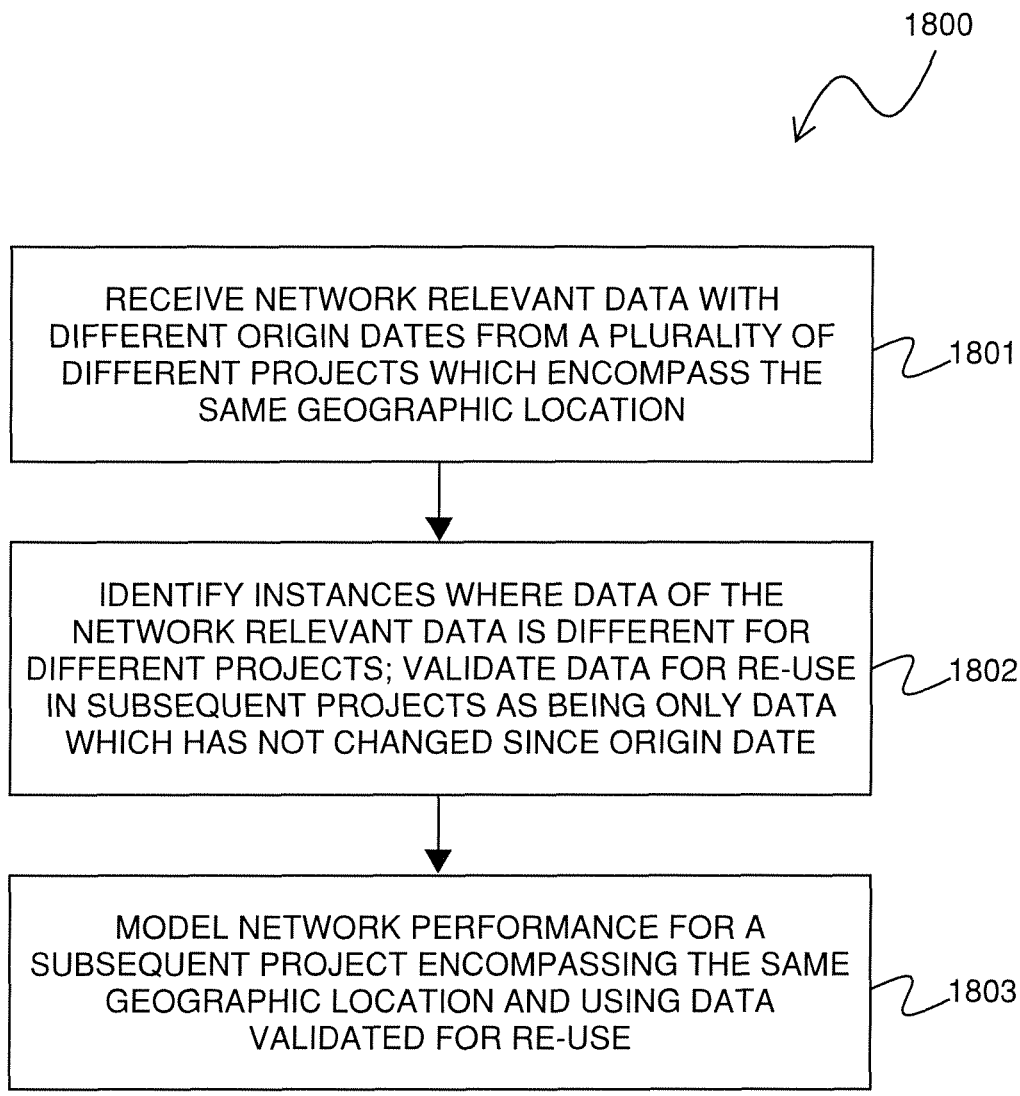
FIG. 18 is yet another exemplary method according to the invention.

FIG. 18 shows a computer implemented method 1800 for telecommunications network design. At block 1801, one or more network relevant data are received in a computer storage medium from at least a plurality of different projects, each of which encompass a same geographic location. Each datum of the one or more network relevant data has associated therewith at least an origin date. The one or more network relevant data are selected from geographic information system (GIS) data, measurement data, project data, asset data, and forecast data. The network relevant data may specifically include or be limited to GIS data. The network relevant data may specifically include or be limited to measurement data. The network relevant data may specifically include or be limited to forecast data. At least some of the plurality of different projects are performed at different times such that each datum of the one or more network relevant data of the at least some of the plurality of different projects have different origin dates. At block 1802, each instance where a datum of the one or more network relevant data is different for different projects is identified using one or more computers. Network relevant data is validated for re-use in subsequent projects only if the data has not changed since its origin date. At block 1803, network performance is modeled for a subsequent project different from the plurality of different projects, the new project encompassing the same geographic location. The modeling step of block 1803 utilizes at least one datum from the one or more network relevant data of the plurality of different projects stored in the computer storage medium that has been validated for re-use in subsequent projects.

Figure 19:
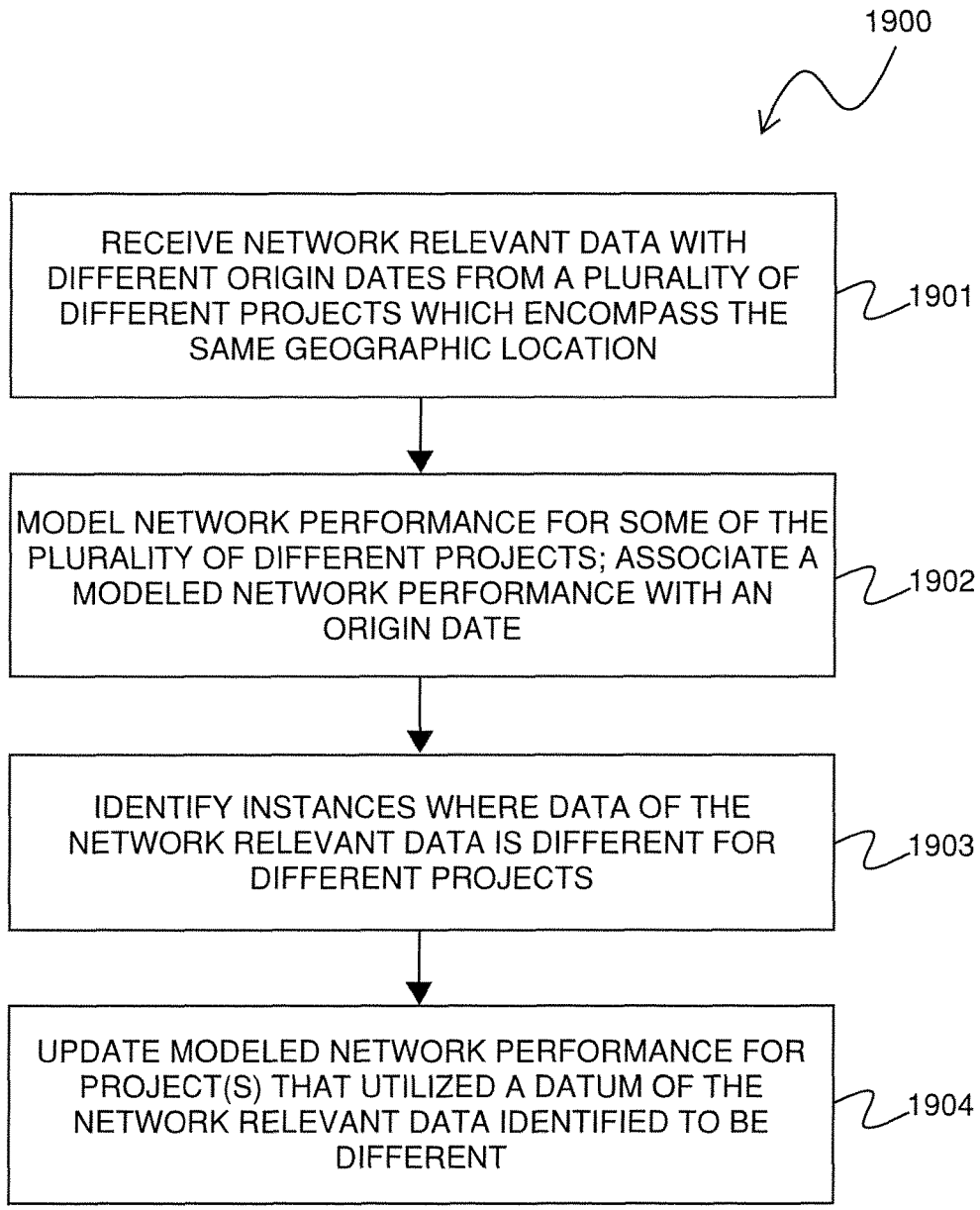
FIG. 19 is still another exemplary method according to the invention.

FIG. 19 shows a computer implemented method 1900 for telecommunications network design. At block 1901, one or more network relevant data are received in a computer storage medium from at least a plurality of different projects, each of which encompass a same geographic location. Each datum of the one or more network relevant data has associated therewith at least an origin date. The one or more network relevant data are selected from geographic information system (GIS) data, measurement data, project data, asset data, and forecast data. The network relevant data may specifically include or be limited to GIS data. The network relevant data may specifically include or be limited to measurement data. The network relevant data may specifically include or be limited to forecast data. At least some of the plurality of different projects are performed at different times such that each datum of the one or more network relevant data of the at least some of the plurality of different projects have different origin dates. At block 1902, network performance is modeled for at least some of the plurality of different projects and a modeled network performance is associated with an origin date in the computer storage medium. At block 1903, each instance where a datum of the one or more network relevant data is different for different projects is identified using one or more computers. At block 1904, modeled network performance is updated for one or more of the at least some of the plurality of different projects modeled in the modeling step of block 1902. The projects receiving the update utilized a datum of the one or more network relevant data identified to be different in the identifying step of block 1903 and are updated using a datum having a latest associated origin date. The method 1900 may include a step of predictively modifying one or more measurement data included in the one or more network relevant data based on one or more network asset changes, the one or more measurement data having associated therewith a new origin date of when modification was performed. The one or more network asset changes may include, for example, at least one of changing asset transmit power levels, adding or removing signal amplification or dampening assets, changing the type of measurement receiver used to collect data, changing antenna types, altering link budgets, and changing frequencies.

In the preceding figures, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

EXAMPLES

Example 1

Project A posts to the shared timeline with plans to deploy three new tower sites in the RTP area. The expected deployment date of each tower is noted, stretching out over an 18 month window of time. Two months later, Project B posts to the shared timeline with a drive test data set in the RTP area. When the new drive test enters the platform, the platform automatically pools the measurement data into the larger data set, recalibrates the prediction modules, and automatically updates the predicted performance plots for Project A at each of its three time increments (i.e., each of the tower deployments). The platform then identifies that the network's predicted performance following the second tower site falls outside desired goals; the state of Project A is automatically updated, and the project owner of Project A is automatically notified. The owner of Project B is also automatically notified that Project A has been affected.

Example 2

A nationwide wireless telecommunications company typically breaks the nation up into regions or markets, with each region or market focused on the assets and performance of the network in just that area. There needs to be some degree of human cooperation/communication between adjacent regions when it comes to asset placements near to the regional intersections. For example, it is undesirable for an independent region to place new tower sites near to the adjacent region without coordinating on the impact to the adjacent region's customers. This requires "manual" cooperation, meaning that teams from both regions need to run additional performance simulations on the adjacent region, and then both teams need to somehow factor the results into their own separate performance simulations focused on just their own region. The present platform automatically scales to whatever geographical area is occupied by the full network. For example, it is possible to maintain the entire nationwide network within one simulation. Simulation plots for any desired area are automatically scalable to accommodate any and all surrounding assets at any distance from the area. As a result, there are no more hard boundaries between regions and markets. The platform begets streamlined communication/workflow between the teams within such regions and markets.

Example 3

Network expansion today is occurring at multiple geographical resolutions. Large towers are still being deployed with equipment providing coverage across wide areas. Simultaneously, smaller networks with equipment deployed on rooftops or light posts are increasingly being deployed to fill coverage holes and offload subscribers from the larger scale network. Simultaneously, inbuilding and campus networks are being deployed with the goal of improving quality of service for the tenants, filling coverage holes, and offloading subscribers from the larger scale network. This parallel work is increasingly demanding on the network design teams, and in many instances may result in focused sub-teams being created to focus on just one type of network deployment. This further increases the need to coordinate and communicate on where and when assets are being deployed. The platform is inherently designed to streamline the communication flow between concurrent teams operating within the same geographic area by capturing all of their designs and proposed new asset placements/configurations within one network model of the complete area.

Example 4

There can be a significant time lapse between when a network design is completed/approved and the actual assets involved in the design are deployed/configured. For example, a network designer may produce a design involving three new tower sites, but those tower sites may actually not be deployed for another 18 months, or see staggered deployment over the next two years. This becomes a huge issue in terms of ongoing planning for network expansion/improvement, magnified by the issue of concurrent teams focused on the same geographic area and/or adjacent regional teams. As example specific, an inbuilding team commits $3 million dollars to deploy a network, but by the time the equipment is purchased, permits were granted, etc. it turns out a separate team managing the outdoor network has additional new assets of their own come online. The outdoor assets had been planned months before, but neither team was communicating with one another. The new outdoor assets improve the quality of service such that the inbuilding network is no longer needed or desired. However, the $3 million dollars has already been committed. The present platform utilizes the concept of the global network timeline. All planned or proposed asset placements/configuration changes are noted on the timeline, which stretches from current day/time out to the last planned future asset work. At each relevant time increment (e.g., each new asset placement), the platform maintains simulated, predicted performance information for the complete network. This is achieved using the scalable cloud base of the platform. At any point in time, a user can directly pull up performance plots for the network. As each team is maintaining their network expansion plans on the timeline, the platform automatically updates network performance as a whole, and each team involved is permitted to see the impact of all planned work of each concurrent or adjacent team. Thus, the inbuilding team can run a simulation prior to committing the $3 million dollars, where the simulation factors in the outdoor network asset additions which are not yet built but which are planned and already committed. The platform shows that the inbuilding team's design will no longer be necessary by the time of its deployment owing to the new outdoor network assets in the process of being constructed and put online.

Example 5

Predictive tools take as an input GIS information. This typically takes the form of terrain, land-use, building vector, population density, subscriber density and subscriber density over time, data usage and projected data usage over time, traffic, etc. Historically, updates to this information was painfully slow. Recent technology has seen availability of updated GIS data improve dramatically; in some cases, even real-time data is achievable. The resolution of available information is also steadily improving. For example, 30 m resolution data may now be available in 1 m resolution. However, the predictive tools still assume a manual process (e.g., File→Import) for accessing GIS data. The platform automatically detects if updated GIS data is available. The platform automatically processes the GIS data (e.g., converts it as needed by the predictive tool), and incorporates it into the predictive tool simulations. So, predicted performance across the shared timeline will always reflect the most recently available GIS information. Any GIS data changes that result in predicted performance at any step in the timeline deviating from configured performance goals/quality of service goals will trigger notifications sent to any project teams whose work on the shared timeline are impacted. For example, if GIS data is updated to reflect new buildings now underway vs old buildings torn down in NYC, this could impact wireless quality of service and will be reflected in the predicted performance maintained across the shared timeline.

Example 6

A building owner contacts a wireless service provider requesting improved inbuilding service. In the absence of the functionality provided by the platform, the wireless service provider would potentially only have direct visibility to the current existing wireless network performance at the building; any future planned work to expand or enhance the existing wireless network (e.g. adding assets to improve performance near to the building) and the resulting performance improvements would not be readily known. With the platform, all future planned network enhancements will have their performance already fully predicted. The wireless service provider can then immediately know whether already planned projects over the next six months will improve the service at the building or whether inbuilding assets may be required to address the building owner's needs.

Example 7

A storm creates an extended power outage that results in various network base stations being out of service. The Assets module notifies the platform which base stations are out of service. The platform then automatically (e.g., by the work of computers and processors without human intervention) generates a system event project detailing the outage event. The outage project is automatically created with a start time being the moment the outage notification reaches the platform, and with an indefinite date for concluding. Every day the outage continues, the outage project persists on the shared timeline. The platform then updates all current and future projects to assess performance impacts, updates their status, and sends the appropriate notifications.

Example 8

A small city is undergoing a period of relatively rapid growth, with new housing developments and apartment buildings being constructed at a fast pace. The current GIS information for the area may still reflect the state of the city prior to the growth, with areas still essentially represented as open areas or farmland. However, it is possible that areas undergoing development may have their GIS information edited to represent what their future state will be, such as "dense residential housing" or "multistory office buildings." This forecasted, future GIS data can be input into the GIS module and positioned at some future date on the shared timeline. That is, the anticipated changes to the GIS data for the region is itself placed in the temporal context of the shared timeline. The platform then automatically updates the predicted network performance at that time based on the forecasted GIS data, and for all future points in time on the shared timeline for all currently planned projects.

While the invention has been described herein in connection with exemplary embodiments and features, one skilled in the art will recognize that the invention is not limited by the disclosure and that various changes and modifications may be made without departing from the scope of the invention as defined by the appended claims.

We claim:

1. A computer implemented method for telecommunications network design and improvement management, comprising steps of:
   providing a central timeline which is a representation of a chronological sequence, said central timeline being maintained on a network of one or more computers;
   populating said central timeline with a plurality of separate projects for network expansion and improvement, wherein each project has:
      its own project timeline including at least a start date or range and one or more project dates subsequent to said start date or range,
      one or more project owners assigned, and
      one or more design goals specifying network performance desired from completion of said project,
   wherein one or more responsible parties to said plurality of separate projects are provided access to said central timeline through one or more electronic terminals configured to communicate with said one or more computers,
   wherein said plurality of separate projects comprises at least a first project and a second project;
   modeling with said one or more computers network performance expected on at least one calendar date on said central timeline based on network changes provided by future completion of at least the first project, wherein said network changes comprise changes in telecommunications assets;
   for the second project, flagging a status change by modifying at least one project state to convey whether the expected network performance from the modeling step is within or outside the desired network performance specified by said second project's one or more design goals;
   with a graphical user interface (GUI), plotting at least some of the plurality of separate projects on one or more of the central timeline, a map, and a calendar;
   with the GUI, visually differentiating projects with unique graphical markers, icons, or color coding; and
   with the GUI, supplying a notification to said project owner of the second project with the flagged status change.

2. The computer implemented method of claim 1, further comprising a step of
   repeatedly obtaining updated network relevant data including one or more of updated geographic information system (GIS) data, updated measurement data, updated project data, updated asset data, and updated forecast data,
   wherein said step of modeling network performance is further based on network changes associated with one or more of said updated network relevant data.

3. The computer implemented method of claim 2, wherein said step of repeatedly obtaining updated network relevant data includes obtaining measurement data collected in connection with said first project of said plurality of separate projects and wherein said second project is temporally parallel or subsequent to said first project, wherein said second project relies upon or utilizes to said measurement data collected in connection with said first project.

4. The computer implemented method of claim 1, further comprising a step of generating one or more of a notification, an update, or action proposal for one or more projects of said plurality of separate projects which have future deadlines on said central timeline, said generating step being an automated response based on said network performance modeling of said modeling step.

5. The computer implemented method of claim 1, wherein said network changes involve changes in quality of service (QoS).

6. The computer implemented method of claim 1, further comprising a step of obtaining one or more updated predictive models for use in said modeling step.

7. The computer implemented method of claim 1, further comprising a step of automatically generating one or more projects in response to one or more events without a user command to create a new project, at least one project of said one or more projects being included on said central timeline in said populating step.

8. The computer implemented method of claim 1, further comprising a step of modeling with said one or more computers network performance expected on at least one calendar date on said central timeline based on network changes provided by a network-impacting event, wherein said network changes comprise changes in telecommunications assets, and wherein said network-impacting event is a network outage event.

9. The computer implemented method of claim 8, wherein the network-impacting event takes place on at least one future calendar date.

10. The computer implemented method of claim 1, wherein the modifying step modifies a project state of at least one completed project.

11. The computer implemented method of claim 1, wherein the modeling step models network performance expected on at least one future calendar date on said central timeline.

12. A computer implemented method for telecommunications network design, comprising the steps of:
  receiving in a computer storage medium from at least a plurality of different projects, each of which encompass a same geographic location, one or more network relevant data for each of said plurality of different projects,
    wherein each datum of said one or more network relevant data has associated therewith at least an origin date,
    wherein said one or more network relevant data are selected from geographic information system (GIS) data, measurement data, project data, asset data, prediction data, and forecast data,
    wherein at least some of said plurality of different projects are performed at different times such that each datum of said one or more network relevant data of said at least some of said plurality of different projects have different origin dates;
  identifying, using one or more computers, each instance where a datum of said one or more network relevant data is different for different projects, and validating data for re-use in subsequent projects as being only data which has not changed since its origin date;
  flagging or automatically removing from the computer storage medium data which was not validated in the identifying step; and
  modeling network performance for a subsequent project different from said plurality of different projects, said new project encompasses said same geographic location, said modeling step utilizing at least one datum from said one or more network relevant data of said plurality of different projects stored in said computer storage medium that has been validated for re-use in subsequent projects.

13. The computer implemented method of claim 12, wherein said one or more network relevant data includes GIS data.

14. The computer implemented method of claim 12, wherein said one or more network relevant data includes measurement data.

15. The computer implemented method of claim 12, wherein said one or more network relevant data includes forecast data.

16. A computer implemented method for telecommunications network design, comprising the steps of:
  receiving in a computer storage medium from at least a plurality of different projects, each of which encompass a same geographic location, one or more network relevant data for each of said plurality of different projects,
    wherein each datum of said one or more network relevant data has associated therewith at least an origin date,
    wherein said one or more network relevant data are selected from geographic information system (GIS) data, measurement data, project data, asset data, prediction data, and forecast data,
    wherein at least some of said plurality of different projects are performed at different times such that each datum of said one or more network relevant data of said at least some of said plurality of different projects have different origin dates;
  modeling network performance for at least some said plurality of different projects and associating a modeled network performance with an origin date in said computer storage medium;
  identifying, using one or more computers, each instance where a datum of said one or more network relevant data is different for different projects;
  flagging data which identified to be different in said identifying step; and
  updating modeled network performance for one or more of said at least some of said plurality of different projects modeled in said modeling step, that utilized a datum of said one or more network relevant data flagged in said flagging step using a datum having a latest associated origin date.

17. The computer implemented method of claim 16, further comprising a step of predictively modifying one or more measurement data included in said one or more network relevant data based on one or more network asset changes, said one or more measurement data having associated therewith a new origin date of when modification was performed.

18. The computer implemented method of claim 17, wherein said one or more network asset changes include at least one of changing asset transmit power levels, adding or removing signal amplification or dampening assets, changing the type of measurement receiver used to collect data, changing antenna types, altering link budgets, and changing frequencies.

19. The computer implemented method of claim 16, wherein said one or more network relevant data includes GIS data.

20. The computer implemented method of claim 16, wherein said one or more network relevant data includes measurement data.

21. The computer implemented method of claim 16, wherein said one or more network relevant data includes forecast data.

22. The computer implemented method of claim 1, wherein at least one of said network changes in said modeling step is selected from a group consisting of placing, removing, upgrading, and configuring network assets.

23. The computer implemented method of claim 22, wherein at least one of the network assets placed, removed, upgraded, or configured is selected from a group consisting of base stations, switches, routers, hubs, computers, test equipment, antennas, connectors, splitters, probes, repeaters, extenders, transceivers, access points, virtual computing environments, and towers.

\* \* \* \* \*